(12) United States Patent
Oskotsky et al.

(10) Patent No.: US 10,345,144 B2
(45) Date of Patent: Jul. 9, 2019

(54) COMPACT AND ATHERMAL VNIR/SWIR SPECTROMETER

(71) Applicant: BAE Systems Information and Electronic Systems Integration Inc., Nashua, NH (US)

(72) Inventors: Mark L Oskotsky, Mamaroneck, NY (US); Michael J Russo, Jr., Roslyn, NY (US)

(73) Assignee: BAE Systems Information and Electronics Systems Integration Inc., Nashau, NH (US)

( * ) Notice: Subject to any disclaimer, the term of this patent is extended or adjusted under 35 U.S.C. 154(b) by 0 days.

(21) Appl. No.: 15/646,624

(22) Filed: Jul. 11, 2017

(65) Prior Publication Data
US 2019/0017868 A1    Jan. 17, 2019

(51) Int. Cl.
*G01J 3/02*    (2006.01)
*G01J 3/04*    (2006.01)

(52) U.S. Cl.
CPC .......... *G01J 3/0208* (2013.01); *G01J 3/0256* (2013.01); *G01J 3/04* (2013.01)

(58) Field of Classification Search
CPC .......... G01J 3/0208; G01J 3/0256; G01J 3/04
USPC .......... 250/339.01, 339.02, 339.07
See application file for complete search history.

(56) References Cited

U.S. PATENT DOCUMENTS

| | | | |
|---|---|---|---|
| 5,420,681 A * | 5/1995 | Woodruff | G01J 3/02 356/326 |
| 5,621,575 A | 4/1997 | Toyama | |
| 5,781,290 A * | 7/1998 | Bittner | G01J 3/14 356/326 |
| 6,122,051 A * | 9/2000 | Ansley | G01J 3/02 250/339.05 |
| 6,208,459 B1 | 3/2001 | Coon | |

(Continued)

OTHER PUBLICATIONS

R. Hamilton Shepard, The Design of SWIR Imaging Lenses Using Plastic Optics, Downloaded From: http://spiedigitallibrary.org/ on Apr. 17, 2014 Terms of Use: http://spiedl.org/terms, 11 pages, Published 2012, Proc. of SPIE vol. 8489, 84890A.

(Continued)

*Primary Examiner* — David P Porta
*Assistant Examiner* — Blake C Riddick
(74) *Attorney, Agent, or Firm* — Maine Cernota & Rardin

(57) ABSTRACT

A Compact and Athermal VNIR/SWIR Spectrometer utilizes a slit, a Mangin lens, a pupil lens adjacent to the diffraction grating, corrector lenses, a beam splitter, field lenses and SWIR and VNIR FPAs. In examples, two corrector lenses are used. Some examples do not utilize field lenses and beam splitter, some examples utilize only the SWIR radiation spectrum. By balancing the powers of the optical elements and Abbe numbers of glasses as well as usage of aspheric surfaces combinations, a monochromatic and polychromatic aberrational correction is achieved; by balancing optical elements refractive indices change with temperature an athermalization is achieved. The overall length of the spectrometer does not exceed 4 inches, and in some examples it is 2.5 inches. A wide field of view and a low F number are obtained with an operating wavelength range from approximately 400 to 2350 nm. The spectrometer is particularly suited to airborne applications.

20 Claims, 19 Drawing Sheets

FIRST EMBODIMENT

(56) References Cited

U.S. PATENT DOCUMENTS

| | | | |
|---|---|---|---|
| 6,556,297 B1* | 4/2003 | Cappiello | G01J 3/02 356/328 |
| 6,980,295 B2 | 12/2005 | Lerner | |
| 7,006,217 B2 | 2/2006 | Lerner | |
| 7,199,876 B2 | 4/2007 | Mitchell | |
| 7,271,965 B1 | 9/2007 | Oskotsky | |
| 7,609,381 B2 | 10/2009 | Warren | |
| 7,768,642 B2 | 8/2010 | Oskotsky | |
| 8,203,710 B1 | 6/2012 | Mitchell | |
| 8,289,633 B2 | 10/2012 | Caldwell | |
| 8,339,600 B2 | 12/2012 | Chrisp | |
| 8,520,204 B2 | 8/2013 | Desserouer | |
| 8,817,392 B2 | 8/2014 | Oskotsky | |
| 9,689,744 B2* | 6/2017 | Chrisp | G01J 3/2823 |
| 2002/0126278 A1* | 9/2002 | Olshausen | G01J 3/02 356/328 |
| 2003/0234751 A1* | 12/2003 | Hwang | G02B 3/0056 345/32 |
| 2004/0145819 A1 | 7/2004 | Wang et al. | |
| 2004/0156048 A1* | 8/2004 | Mitchell | G01J 3/02 356/305 |
| 2004/0239939 A1* | 12/2004 | Guerineau | G01J 3/0259 356/454 |
| 2005/0052647 A1* | 3/2005 | Lerner | G01J 3/18 356/328 |
| 2005/0179895 A1* | 8/2005 | Puppels | G01J 3/18 356/328 |
| 2005/0259253 A1* | 11/2005 | Lerner | G01J 3/18 356/328 |
| 2006/0038994 A1* | 2/2006 | Chrisp | G01J 3/18 356/328 |
| 2006/0082772 A1* | 4/2006 | Kehoe | G01J 3/02 356/328 |
| 2007/0098324 A1* | 5/2007 | Kitamura | G02B 5/1861 385/37 |
| 2007/0164221 A1* | 7/2007 | Russell | G01J 3/02 250/339.07 |
| 2007/0171415 A1* | 7/2007 | Chrisp | G01J 3/02 356/328 |
| 2008/0273244 A1* | 11/2008 | Oskotsky | G02B 17/0812 359/558 |
| 2009/0237657 A1* | 9/2009 | Warren | G01J 3/02 356/328 |
| 2009/0296201 A1* | 12/2009 | Caldwell | G02B 13/146 359/354 |
| 2010/0051802 A1* | 3/2010 | Marchman | H01J 37/226 250/306 |
| 2010/0245650 A1* | 9/2010 | Kreysar | G01J 3/02 348/311 |
| 2010/0328659 A1* | 12/2010 | Bodkin | G01J 3/02 356/326 |
| 2011/0188038 A1* | 8/2011 | Gollier | G01N 21/7743 356/328 |
| 2011/0222061 A1* | 9/2011 | Desserouer | G01J 3/1838 356/328 |
| 2011/0285995 A1* | 11/2011 | Tkaczyk | G01J 3/02 356/326 |
| 2012/0002202 A1* | 1/2012 | Chrisp | G01J 3/0208 356/328 |
| 2012/0062889 A1* | 3/2012 | Chrisp | G01J 3/0256 356/328 |
| 2012/0147483 A1* | 6/2012 | Oskotsky | G02B 7/028 359/753 |
| 2013/0148195 A1* | 6/2013 | Achal | G01J 3/0208 359/351 |
| 2013/0229654 A1* | 9/2013 | Tatsuta | G02B 27/0905 356/328 |
| 2014/0071449 A1 | 3/2014 | Robinson | |
| 2014/0160474 A1* | 6/2014 | Keller | G01N 21/3504 356/246 |
| 2015/0241667 A1* | 8/2015 | Staver | G02B 13/146 250/349 |
| 2015/0369917 A1* | 12/2015 | Bridges | H04N 1/00827 356/4.01 |
| 2016/0041033 A1* | 2/2016 | Oskotsky | G01J 3/2823 356/328 |
| 2018/0067280 A1* | 3/2018 | Unger | G02B 9/34 |
| 2018/0080826 A1* | 3/2018 | Silny | G01J 3/18 |
| 2018/0136039 A1* | 5/2018 | Rolland | G01J 3/021 |

OTHER PUBLICATIONS

R. Hamilton Shepard, Material Selection for Color Correction in the Short-Wave Infrared, Downloaded From: http://spiedigitallibrary. org/ on Apr. 17, 2014 Terms of Use: http://spiedl.org/terms, 10 pages, Published 2008, Proc. of SPIE vol. 7060, 70600E.

M. Maszkiewicz, Optics for the Canadian Hyperspectral Mission (HERO), Proc. '6th Internat. Conf. on Space Optics', ESTEC, Noordwijk, The Netherlands, Jun. 27-30, 2006 (ESA SP-621, Jun. 2006), 4 pages.

* cited by examiner

FIRST EMBODIMENT

MTF FOR FIRST EMBODIMENT

SWIR: 43 MICRONS DEFOCUS RANGE FOR -20DEG. C TO + 40 DEG. C

THERMAL DEFOCUS FOR FIRST EMBODIMENT

```
          RDY        THI    RMD    GLA       CCY THC GLC
> OBJ:   INFINITY   1.401168                 100  0
  1:      2.71015   0.450000  CAF2_SCHOTT     10  100
  ASP:
  K :  0.000000  KC :   100
  CUF: 0.000000  CCF:   100
  A :-.164000E-01  B :0.295828E-02  C :-.102841E-02  D :0.122243E-03
  AC :   77    BC :   78    CC :   79    DC :   80
  XDE: 0.000000  YDE: 0.000000  ZDE: 0.000000
  XDC:   100    YDC:   100    ZDC:   100
  ADE: -0.247952  BDE: 0.000000  CDE: 0.000000
  ADC:    0     BDC:   100    CDC:   100

2:     -25.75095  -0.450000 REFL CAF2_SCHOTT    -1  PIK
  XDE: 0.000000  YDE: 0.000000  ZDE: 0.000000 BEN
  XDC:   100    YDC:   100    ZDC:   100
  ADE: 0.000000  BDE: 0.000000  CDE: 0.000000
  ADC:   100    BDC:   100    CDC:   100

3:      2.71015  -1.468711              PIK  22
  ASP:
  K :  0.000000  KC :   100
  CUF: 0.000000  CCF:   100
  A :-.164000E-01  B :0.295828E-02  C :-.102841E-02  D :0.122243E-03
  AC :   77    BC :   78    CC :   79    DC :   80

4:      2.12104  -0.150000  NKZFS8_SCHOTT   20  100
  5:      2.60885  -0.200000                  30   32
  ASP:
  K :  0.000000  KC :   100
  CUF: 0.000000  CCF:   100
  A :-.666628E-02  B :0.689624E-03  C :-.147752E-01  D :0.233786E-01
  AC :   23    BC :   24    CC :   26    DC :   27

STO:      4.88170   0.200000 REFL              0  PIK
  GRT:
  GRO: 1.000000  GRS: 0.000880
  ROC:   100    RSC:    0
  GRX: 0.000000  GRY: 1.000000  GRZ: 0.000000
  RXC:   100    RYC:   100    RZC:   100
              BLT: IDEAL
  XDE: 0.000000  YDE: 0.000000  ZDE: 0.000000 DAR
  XDC:   100    YDC:   100    ZDC:   100
  ADE: 0.865734  BDE: 0.000000  CDE: 0.000000
  ADC:    0     BDC:   100    CDC:   100

7:      2.60885   0.150000  NKZFS8_SCHOTT  PIK PIK PIK
  ASP:
  K :  0.000000  KC :   100
  CUF: 0.000000  CCF:   100
  A :-.666628E-02  B :0.689624E-03  C :-.147752E-01  D :0.233786E-01
  AC :   23    BC :   24    CC :   26    DC :   27

8:      2.12104   1.468711              PIK -22
  9:      2.71015   0.450000  CAF2_SCHOTT   PIK PIK PIK
  ASP:
  K :  0.000000  KC :   100
  CUF: 0.000000  CCF:   100
  A :-.164000E-01  B :0.295828E-02  C :-.102841E-02  D :0.122243E-03
  AC :   77    BC :   78    CC :   79    DC :   80
```

FIRST EMBODIMENT PRESCRIPTION PAGE 1 OF 4

FIG. 4A

```
10:   -25.75095    0.005000              PIK    0
11:     3.82977    0.400000    CAF2_SCHOTT     0  100
  ASP:
  K :  0.000000  KC :   100
  CUF: 0.000000  CCF:   100
  A :0.966888E-02  B :0.442417E-02  C :-.303709E-02  D :0.676723E-03
  AC :   0    BC :   0    CC :   0    DC :   0

12:    -4.70553    0.305174              0    0
13:    INFINITY    0.521115    AIR           100   55
  XDE: 0.000000  YDE: -0.400000  ZDE:  0.000000  BEN
  XDC:  100     YDC:  100       ZDC:  100
  ADE: 0.000000  BDE:  0.000000  CDE:  0.000000
  ADC:  100     BDC:  100       CDC:  100

14:    11.04175    0.100000   NSK11_SCHOTT    14  100
  XDE: 0.000000  YDE: -0.345433  ZDE:  0.000000
  XDC:  100     YDC:   0        ZDC:  100
  ADE: 0.000000  BDE:  0.000000  CDE:  0.000000
  ADC:  100     BDC:  100       CDC:  100

15:   -25.65589    0.200000               16  110
IMG:   INFINITY    0.000000              100  100
  XDE:  0.000000  YDE:  0.000000  ZDE:  0.000000  DAR
  XDC:  100      YDC:  100       ZDC:  100
  ADE: -3.446832  BDE: -0.000796  CDE:  0.000000
  ADC:   76      BDC:   93       CDC:  100

SPECIFICATION DATA
  FNO   3.30000
  TEL
  DIM   IN
  WL    2350.00   1625.00   1000.00   900.00   650.00   400.00
  REF     1
  WTW     1         0         0         0        0
  XOB   0.00000   0.34000   0.68000  -0.34000  -0.68000
  YOB   0.90000   0.90000   0.90000   0.90000   0.90000
  WTF   1.00000   1.00000   1.00000   1.00000   1.00000
  VUX   0.00000   0.00000   0.00000   0.00000   0.00000
  VLX   0.00000   0.00000   0.00000   0.00000   0.00000
  VUY   0.00000   0.00000   0.00000   0.00000   0.00000
  VLY   0.00000   0.00000   0.00000   0.00000   0.00000
  POL     N
```

FIRST EMBODIMENT PRESCRIPTION PAGE 2 OF 4
FIG. 4B

APERTURE DATA/EDGE DEFINITIONS
 CA APE
  APERTURE data not specified for surface Obj thru 16

REFRACTIVE INDICES
| GLASS CODE | 2350.00 | 1625.00 | 1000.00 | 900.00 | 650.00 | 400.00 |
|---|---|---|---|---|---|---|
| CAF2_SCHOTT | 1.421984 | 1.425685 | 1.428893 | 1.429622 | 1.432570 | 1.441834 |
| NKZFS8_SCHOTT | 1.674739 | 1.687806 | 1.699630 | 1.702511 | 1.714842 | 1.759626 |
| NSK11_SCHOTT | 1.535575 | 1.545780 | 1.553508 | 1.555097 | 1.561235 | 1.580173 |

No solves defined in system

PICKUPS
 PIK THI S6 Z1 THI S5 Z1 -1.000000
 PIK RDY S10 Z1 RDY S2 Z1
 PIK RDY S3 Z1 RDY S1 Z1
 PIK RDY S9 Z1 RDY S1 Z1
 PIK RDY S8 Z1 RDY S4 Z1
 PIK RDY S7 Z1 RDY S5 Z1
 PIK GLA S7 Z1 GLA S4 Z1
 PIK THI S7 Z1 THI S4 Z1 -1.000000
 PIK THI S2 Z1 THI S1 Z1 -1.000000
 PIK THI S9 Z1 THI S1 Z1
 PIK GLA S9 Z1 GLA S1 Z1

ZOOM DATA
| | POS 1 | POS 2 | POS 3 | POS 4 | POS 5 | POS 6 |
|---|---|---|---|---|---|---|
| WTW W1 | 1 | 0 | 0 | 0 | 0 | 0 |
| WTW W2 | 0 | 1 | 0 | 0 | 0 | 0 |
| WTW W3 | 0 | 0 | 1 | 0 | 0 | 0 |
| WTW W4 | 0 | 0 | 0 | 1 | 0 | 0 |
| WTW W5 | 0 | 0 | 0 | 0 | 1 | 0 |
| WTW W6 | 0 | 0 | 0 | 0 | 0 | 1 |
| REF | 1 | 2 | 3 | 4 | 5 | 6 |
| GRO S6 | 1.00000 | 1.00000 | 1.00000 | 2.00000 | 2.00000 | 2.00000 |
| ROC S6 | 100 | 100 | 100 | 100 | 100 | 100 |
| RMD S13 | REFR | REFR | REFR | REFL | REFL | REFL |
| THI S13 | 0.52111 | 0.52111 | 0.52111 | -0.52207 | -0.52207 | -0.52207 |
| THC S13 | 55 | 55 | 55 | 56 | 56 | 56 |
| ADE S13 | 0.00000 | 0.00000 | 0.00000 | 45.00000 | 45.00000 | 45.00000 |
| ADC S13 | 100 | 100 | 100 | 100 | 100 | 100 |
| THI S14 | 0.10000 | 0.10000 | 0.10000 | -0.10000 | -0.10000 | -0.10000 |
| THC S14 | 100 | 100 | 100 | 100 | 100 | 100 |
| RDY S14 | 11.04175 | 11.38338 | 11.38338 | -25.23347 | -25.23347 | -25.23347 |
| CCY S14 | 14 | 14 | 14 | 15 | 15 | 15 |
| THI S15 | 0.20000 | 0.20000 | 0.20000 | -0.20000 | -0.20000 | -0.20000 |
| THC S15 | 110 | 110 | 110 | 111 | 111 | 111 |
| RDY S15 | -25.65589 | -27.44947 | -27.44947 | 21.29391 | 21.29391 | 21.29391 |
| CCY S15 | 16 | 16 | 16 | 17 | 17 | 17 |
| THI S16 | 0.00000 | 0.00000 | 0.00000 | 0.00000 | 0.00000 | 0.00000 |
| THC S16 | 100 | 100 | 100 | 100 | 100 | 100 |
| ADE S16 | -3.44683 | -3.44683 | -3.44683 | 2.49728 | 2.49728 | 2.49728 |
| ADC S16 | 76 | 76 | 76 | 77 | 77 | 77 |
| BDE S16 | -0.00080 | -0.00080 | -0.00080 | -0.00492 | -0.00492 | -0.00492 |
| BDC S16 | 93 | 93 | 93 | 94 | 94 | 94 |
| RDY S16 | INFINITY | INFINITY | INFINITY | INFINITY | INFINITY | INFINITY |
| CCY S16 | 100 | 100 | 100 | 100 | 100 | 100 |
| GL1 S13 | AIR | AIR | AIR | AIR | AIR | AIR |
| GC1 S13 | 100 | 100 | 100 | 100 | 100 | 100 |
| GP1 S13 | AIR | AIR | AIR | AIR | AIR | AIR |

FIRST EMBODIMENT PRESCRIPTION PAGE 3 OF 4
FIG. 4C

This is a non-symmetric system. If elements with power are decentered or tilted, the first order properties are probably inadequate in describing the system characteristics.

|  | POS 1 | POS 2 | POS 3 | POS 4 | POS 5 | POS 6 |
|---|---|---|---|---|---|---|
| INFINITE CONJUGATES | | | | | | |
| EFL | 7.8461 | 7.9778 | 8.2461 | -7.1147 | -7.2902 | -7.9017 |
| BFL | -7.6635 | -7.8021 | -8.0727 | 6.9798 | 7.1581 | 7.7777 |
| FFL | 6.4450 | 6.5726 | 6.8410 | 5.6713 | 5.8451 | 6.4486 |
| FNO | 0.0000 | 0.0000 | 0.0000 | 0.0000 | 0.0000 | 0.0000 |
| AT USED CONJUGATES | | | | | | |
| RED | 1.0000 | 1.0005 | 1.0005 | 1.0060 | 1.0061 | 1.0066 |
| FNO | 3.3000 | 3.3000 | 3.3000 | 3.3000 | 3.3000 | 3.3000 |
| OBJ DIS | 1.4012 | 1.4012 | 1.4012 | 1.4012 | 1.4012 | 1.4012 |
| TT | 3.3825 | 3.3825 | 3.3825 | 1.7393 | 1.7393 | 1.7393 |
| IMG DIS | 0.2000 | 0.2000 | 0.2000 | -0.2000 | -0.2000 | -0.2000 |
| OAL | 1.7813 | 1.7813 | 1.7813 | 0.5381 | 0.5381 | 0.5381 |
| PARAXIAL IMAGE | | | | | | |
| HT | 0.9000 | 0.9005 | 0.9004 | 0.9054 | 0.9055 | 0.9060 |
| THI | 0.1825 | 0.1797 | 0.1774 | -0.1774 | -0.1762 | -0.1762 |
| ANG | 0.0000 | 0.0000 | 0.0000 | 0.0000 | 0.0000 | 0.0000 |
| ENTRANCE PUPIL | | | | | | |
| DIA | 0.3066E+10 | 0.3067E+10 | 0.3067E+10 | 0.3084E+10 | 0.3085E+10 | 0.3086E+10 |
| THI | 0.1000E+11 | 0.1000E+11 | 0.1000E+11 | 0.1000E+11 | 0.1000E+11 | 0.1000E+11 |
| EXIT PUPIL | | | | | | |
| DIA | 2.4054 | 2.4470 | 2.5293 | 2.1945 | 2.2488 | 2.4388 |
| THI | -7.6635 | -7.8021 | -8.0727 | 6.9798 | 7.1581 | 7.7777 |
| STO DIA | 1.0278 | 1.0114 | 0.9967 | 0.9977 | 0.9843 | 0.9427 |

FIRST EMBODIMENT PRESCRIPTION PAGE 4 OF 4
FIG. 4D

MTF FOR SECOND EMBODIMENT

```
         RDY       THI  RMD   GLA       CCY THC GLC
> OBJ:  INFINITY  1.502546            100  0
  1:    2.84850   0.450000    CAF2_SCHOTT    10  100
  ASP:
  K :  0.000000  KC :  100
  CUF: 0.000000  CCF:  100
  A :-.139793E-01  B :0.252997E-02  C :-.940048E-03  D :0.126025E-03
  AC :  77    BC :  78    CC :  79    DC :  80
  XDE: 0.000000  YDE: 0.000000  ZDE: 0.000000
  XDC: 100      YDC: 100      ZDC: 100
  ADE: 1.101800  BDE: 0.000000  CDE: 0.000000
  ADC:  0       BDC: 100       CDC: 100

2:   -31.22769  -0.450000  REFL CAF2_SCHOTT    -1  PIK
  XDE: 0.000000  YDE: 0.000000  ZDE: 0.000000  BEN
  XDC: 100      YDC: 100      ZDC: 100
  ADE: 0.000000  BDE: 0.000000  CDE: 0.000000
  ADC: 100      BDC: 100       CDC: 100

3:    2.84850   -1.519515              PIK  22
  ASP:
  K :  0.000000  KC :  100
  CUF: 0.000000  CCF:  100
  A :-.139793E-01  B :0.252997E-02  C :-.940048E-03  D :0.126025E-03
  AC :  77    BC :  78    CC :  79    DC :  80

4:    3.31227   -0.150000    NKZFS8_SCHOTT    20  100
  5:    4.29497   -0.200000                     30  32
  ASP:
  K :  0.000000  KC :  100
  CUF: 0.000000  CCF:  100
  A :-.651529E-02  B :0.126478E-02  C :-.119493E-01  D :0.132354E-01
  AC :  23    BC :  24    CC :  26    DC :  27

STO:   5.01583   0.200000 REFL            0  PIK
  GRT:
  GRO: 1.000000  GRS: 0.000810
  ROC: 100      RSC:  0
  GRX: 0.000000  GRY: 1.000000  GRZ: 0.000000
  RXC: 100      RYC: 100       RZC: 100
                    BLT: IDEAL
  XDE: 0.000000  YDE: 0.000000  ZDE: 0.000000  DAR
  XDC: 100      YDC: 100      ZDC: 100
  ADE: 1.303786  BDE: 0.000000  CDE: 0.000000
  ADC:  0       BDC: 100       CDC: 100

7:    4.29497   0.150000    NKZFS8_SCHOTT    PIK  PIK  PIK
  ASP:
  K :  0.000000  KC :  100
  CUF: 0.000000  CCF:  100
  A :-.651529E-02  B :0.126478E-02  C :-.119493E-01  D :0.132354E-01
  AC :  23    BC :  24    CC :  26    DC :  27

8:    3.31227   1.519515              PIK  -22
  9:    2.84850   0.450000    CAF2_SCHOTT    PIK  PIK  PIK
  ASP:
  K :  0.000000  KC :  100
  CUF: 0.000000  CCF:  100
  A :-.139793E-01  B :0.252997E-02  C :-.940048E-03  D :0.126025E-03
  AC :  77    BC :  78    CC :  79    DC :  80
```

SECOND EMBODIMENT PRESCRIPTION PAGE 1 OF 4

FIG. 7A

```
10:    -31.22769    0.005000              PIK    0
11:      6.00514    0.400000    CAF2_SCHOTT     0  100
12:     -2.84553    0.825485                    0    0
 ASP:
 K :  0.000000  KC :   100
 CUF: 0.000000  CCF:   100
 A :0.113907E-01  B :0.117317E-03  C :0.233777E-02  D :-.146342E-03
 AC :    0   BC :    0    CC :    0    DC :    0

13:     -2.12368    0.250000    NSK11_SCHOTT    0  100
 XDE: 0.000000  YDE: 0.000000  ZDE: 0.000000
 XDC:    100   YDC:    100   ZDC:    100
 ADE: 0.000000  BDE: 0.000000  CDE: 0.000000
 ADC:    100   BDC:    100   CDC:    100

14:     -1.81180    0.200000                    0  110
IMG:    INFINITY   0.000000                  100  100
 XDE: 0.000000   YDE: 0.000000  ZDE: 0.000000 DAR
 XDC:    100    YDC:    100    ZDC:    100
 ADE: -3.840739  BDE: 0.002375  CDE: 0.000000
 ADC:    76     BDC:    93     CDC:    100

SPECIFICATION DATA
 FNO      3.30000
 TEL
 DIM      IN
 WL    2350.00  1625.00  1000.00   900.00   650.00   400.00
 REF      1
 WTW      1        0        0        0        0        0
 XOB   0.00000  0.34000  0.68000  -0.34000  -0.68000
 YOB   0.90000  0.90000  0.90000   0.90000   0.90000
 WTF   1.00000  1.00000  1.00000   1.00000   1.00000
 VUX   0.00000  0.00000  0.00000   0.00000   0.00000
 VLX   0.00000  0.00000  0.00000   0.00000   0.00000
 VUY   0.00000  0.00000  0.00000   0.00000   0.00000
 VLY   0.00000  0.00000  0.00000   0.00000   0.00000
 POL      N

APERTURE DATA/EDGE DEFINITIONS
 CA APE
    APERTURE data not specified for surface Obj thru  15

REFRACTIVE INDICES
  GLASS CODE       2350.00   1625.00   1000.00   900.00   650.00   400.00
  CAF2_SCHOTT     1.421984  1.425685  1.428893  1.429622  1.432570  1.441834
  NKZFS8_SCHOTT   1.674739  1.687806  1.699630  1.702511  1.714842  1.759626
  NSK11_SCHOTT    1.535575  1.545780  1.553508  1.555097  1.561235  1.580173

No solves defined in system
```

SECOND EMBODIMENT PRESCRIPTION PAGE 2 OF 4

FIG. 7B

PICKUPS
  PIK THI S6 Z1 THI S5 Z1 -1.000000
  PIK RDY S10 Z1 RDY S2 Z1
  PIK RDY S3 Z1 RDY S1 Z1
  PIK RDY S9 Z1 RDY S1 Z1
  PIK RDY S8 Z1 RDY S4 Z1
  PIK RDY S7 Z1 RDY S5 Z1
  PIK GLA S7 Z1 GLA S4 Z1
  PIK THI S7 Z1 THI S4 Z1 -1.000000
  PIK THI S2 Z1 THI S1 Z1 -1.000000
  PIK THI S9 Z1 THI S1 Z1
  PIK GLA S9 Z1 GLA S1 Z1

ZOOM DATA

| | POS 1 | POS 2 | POS 3 | POS 4 | POS 5 | POS 6 |
|---|---|---|---|---|---|---|
| WTW W1 | 1 | 0 | 0 | 0 | 0 | 0 |
| WTW W2 | 0 | 1 | 0 | 0 | 0 | 0 |
| WTW W3 | 0 | 0 | 1 | 0 | 0 | 0 |
| WTW W4 205 | 0 | 0 | 0 | 1 | 0 | 0 |
| WTW W5 | 0 | 0 | 0 | 0 | 1 | 0 |
| WTW W6 | 0 | 0 | 0 | 0 | 0 | 1 |
| REF | 1 | 2 | 3 | 4 | 5 | 6 |

This is a non-symmetric system. If elements with power are decentered or tilted, the first order properties are probably inadequate in describing the system characteristics.

SECOND EMBODIMENT PRESCRIPTION PAGE 3 OF 4
FIG. 7C

|  | POS 1 | POS 2 | POS 3 | POS 4 | POS 5 | POS 6 |
|---|---|---|---|---|---|---|
| INFINITE CONJUGATES | | | | | | |
| EFL | 8.0374 | 8.3490 | 8.6303 | 8.6954 | 8.9661 | 9.9356 |
| BFL | -7.9099 | -8.2264 | -8.5120 | -8.5779 | -8.8519 | -9.8299 |
| FFL | 6.5349 | 6.8442 | 7.1234 | 7.1880 | 7.4565 | 8.4173 |
| FNO | 0.0000 | 0.0000 | 0.0000 | 0.0000 | 0.0000 | 0.0000 |
| AT USED CONJUGATES | | | | | | |
| RED | 1.0000 | 1.0003 | 1.0005 | 1.0006 | 1.0008 | 1.0016 |
| FNO | 3.3000 | 3.3000 | 3.3000 | 3.3000 | 3.3000 | 3.3000 |
| OBJ DIS | 1.5025 | 1.5025 | 1.5025 | 1.5025 | 1.5025 | 1.5025 |
| TT | 3.6330 | 3.6330 | 3.6330 | 3.6330 | 3.6330 | 3.6330 |
| IMG DIS | 0.2000 | 0.2000 | 0.2000 | 0.2000 | 0.2000 | 0.2000 |
| OAL | 1.9305 | 1.9305 | 1.9305 | 1.9305 | 1.9305 | 1.9305 |
| PARAXIAL IMAGE | | | | | | |
| HT | 0.9000 | 0.9002 | 0.9005 | 0.9005 | 0.9007 | 0.9014 |
| THI | 0.1275 | 0.1248 | 0.1227 | 0.1223 | 0.1212 | 0.1215 |
| ANG | 0.0000 | 0.0000 | 0.0000 | 0.0000 | 0.0000 | 0.0000 |
| ENTRANCE PUPIL | | | | | | |
| DIA | 0.3066E+10 | 0.3067E+10 | 0.3067E+10 | 0.3067E+10 | 0.3068E+10 | 0.3071E+10 |
| THI | 0.1000E+11 | 0.1000E+11 | 0.1000E+11 | 0.1000E+11 | 0.1000E+11 | 0.1000E+11 |
| EXIT PUPIL | | | | | | |
| DIA | 2.4640 | 2.5602 | 2.6472 | 2.6673 | 2.7509 | 3.0509 |
| THI | -7.9099 | -8.2264 | -8.5120 | -8.5779 | -8.8519 | -9.8299 |
| STO DIA | 1.0424 | 1.0270 | 1.0136 | 1.0106 | 0.9983 | 0.9600 |

SECOND EMBODIMENT PRESCRIPTION PAGE 4 OF 4

FIG. 7D

THIRD EMBODIMENT

MTF FOR THIRD EMBODIMENT

```
         RDY      THI    RMD    GLA         CCY  THC  GLC
> OBJ:   INFINITY  1.090096                  100  0
  1:     2.71608  0.300000   CAF2_SCHOTT     10   100
  ASP:
  K :  0.000000  KC :  100
  CUF: 0.000000  CCF:  100
  A :-.372926E-01  B :0.279464E-01  C :-.186547E-01  D :0.547909E-02
  AC :   77    BC :   78    CC :   79    DC :   80
  XDE:  0.000000  YDE:  0.184540  ZDE:  0.000000
  XDC:   100   YDC:    0   ZDC:   100
  ADE: -6.191564  BDE:  0.000000  CDE:  0.000000
  ADC:   0    BDC:   100   CDC:   100

2:    -9.96694  -0.300000 REFL CAF2_SCHOTT    -1  PIK
  XDE:  0.000000  YDE:  0.000000  ZDE:  0.000000  BEN
  XDC:   100   YDC:   100   ZDC:   100
  ADE:  0.000000  BDE:  0.000000  CDE:  0.000000
  ADC:   100   BDC:   100   CDC:   100

3:     2.71608  -0.897105                  PIK  22
  ASP:
  K :  0.000000  KC :  100
  CUF: 0.000000  CCF:  100
  A :-.372926E-01  B :0.279464E-01  C :-.186547E-01  D :0.547909E-02
  AC :   77    BC :   78    CC :   79    DC :   80

4:   -15.15470  -0.150000   NKZFS8_SCHOTT   20   100
  5:   -10.41453  -0.061868                  30   32
  ASP:
  K :  0.000000  KC :  100
  CUF: 0.000000  CCF:  100
  A :-.603062E-02  B :-.474751E+00  C :0.706474E+01  D :-.354609E+02
  AC :   23    BC :   24    CC :   26    DC :   27

STO:   3.56659   0.061868 REFL              0  PIK
  GRT:
  GRO: 1.000000  GRS:  0.005621
  ROC:   100   RSC:    0
  GRX: 0.000000  GRY:  1.000000  GRZ:  0.000000
  RXC:   100   RYC:   100   RZC:   100
            BLT: IDEAL
  XDE:  0.000000  YDE:  0.000000  ZDE:  0.000000  DAR
  XDC:   100   YDC:   100   ZDC:   100
  ADE:  1.016245  BDE:  0.000000  CDE:  0.000000
  ADC:   0    BDC:   100   CDC:   100

7:   -10.41453   0.150000   NKZFS8_SCHOTT   PIK PIK PIK
  ASP:
  K :  0.000000  KC :  100
  CUF: 0.000000  CCF:  100
  A :-.603062E-02  B :-.474751E+00  C :0.706474E+01  D :-.354609E+02
  AC :   23    BC :   24    CC :   26    DC :   27

8:   -15.15470   0.897105                  PIK -22
  9:    2.71608   0.300000   CAF2_SCHOTT     PIK PIK PIK
  ASP:
  K :  0.000000  KC :  100
  CUF: 0.000000  CCF:  100
  A :-.372926E-01  B :0.279464E-01  C :-.186547E-01  D :0.547909E-02
  AC :   77    BC :   78    CC :   79    DC :   80

10:   -9.96694   0.071766                  PIK  0
  11:    1.36912   0.409979   SFPL53_OHARA    0   0
  ASP:
  K :  0.000000  KC :  100
  CUF: 0.000000  CCF:  100
  A :0.125953E-01  B :0.255522E-01  C :0.115246E-02  D :0.190225E-01
  AC :   0    BC :   0    CC :   0    DC :   0
  XDE:  0.000000  YDE: -0.020352  ZDE:  0.000000
  XDC:   100   YDC:    0   ZDC:   100
  ADE:  3.135848  BDE:  0.000000  CDE:  0.000000
  ADC:   0    BDC:   100   CDC:   100
```

THIRD EMBODIMENT PRESCRIPTION PAGE 1 OF 4

FIG. 10A

```
12:    -33.04502   0.135466                    0   0
  XDE:  0.000000  YDE:  0.000000  ZDE:  0.000000
  XDC:  100       YDC:  100       ZDC:  100
  ADE:  0.000000  BDE:  0.000000  CDE:  0.000000
  ADC:  100       BDC:  100       CDC:  100

13:    -3.35739    0.420000   STIH53_OHARA     0   0
  XDE:  0.000000  YDE:  0.008628  ZDE:  0.000000
  XDC:  100       YDC:  0         ZDC:  100
  ADE:  0.731002  BDE:  0.000000  CDE:  0.000000
  ADC:  0         BDC:  100       CDC:  100

14:    -2.43679    0.053816                    0   0
  XDE:  0.000000  YDE:  0.000000  ZDE:  0.000000
  XDC:  100       YDC:  100       ZDC:  100
  ADE:  0.000000  BDE:  0.000000  CDE:  0.000000
  ADC:  100       BDC:  100       CDC:  100

IMG:   INFINITY   0.000000                   100 100
  XDE:  -0.000000 YDE: -0.638837  ZDE:  0.000000  DAR
  XDC:  0         YDC:  0         ZDC:  100
  ADE:  -3.076922 BDE:  0.000000  CDE:  0.000000
  ADC:  0         BDC:  100       CDC:  100

SPECIFICATION DATA
  FNO    3.00000
  DIM    IN
  WL     1700.00  1350.00  1000.00
  REF    1
  WTW    1        0        0
  XOB    0.00000   0.24000   0.48000  -0.24000  -0.48000
  YOB    1.00000   1.00000   1.00000   1.00000   1.00000
  WTF    1.00000   1.00000   1.00000   1.00000   1.00000
  VUX   -0.03234  -0.01943  -0.01104  -0.02538   0.00000
  VLX   -0.03234  -0.02538   0.00000  -0.01943  -0.01104
  VUY    0.00000  -0.00072   0.00000  -0.00072   0.00000
  VLY   -0.03031  -0.02595  -0.01320  -0.02595  -0.01320
  POL    N

APERTURE DATA/EDGE DEFINITIONS
  CA APE
  CIR S0      1.109234
  CIR S1      0.909943
  CIR S2      0.904187
  CIR S3      0.874098
  CIR S4      0.342176
  CIR S5      0.303994
  CIR S6      0.283368
  CIR S7      0.281381
  CIR S8      0.303909
  CIR S9      0.693199
  CIR S10     0.730739
  CIR S11     0.844289
  CIR S12     0.835544
  CIR S13     0.833988
  CIR S14     0.848410
  CIR S15     0.465706
```

THIRD EMBODIMENT PRESCRIPTION PAGE 2 OF 4
FIG. 10B

REFRACTIVE INDICES
  GLASS CODE        1700.00    1350.00    1000.00
  CAF2_SCHOTT       1.425332   1.426979   1.428893
  NKZFS8_SCHOTT     1.686559   1.692437   1.699630
  SFPL53_OHARA      1.429311   1.431354   1.433565
  STIH53_OHARA      1.796934   1.803780   1.813453

No solves defined in system

PICKUPS
  PIK THI S6 Z1 THI S5 Z1 -1.000000
  PIK RDY S10 Z1 RDY S2 Z1
  PIK RDY S3 Z1 RDY S1 Z1
  PIK RDY S9 Z1 RDY S1 Z1
  PIK RDY S8 Z1 RDY S4 Z1
  PIK RDY S7 Z1 RDY S5 Z1
  PIK GLA S7 Z1 GLA S4 Z1
  PIK THI S7 Z1 THI S4 Z1 -1.000000
  PIK THI S2 Z1 THI S1 Z1 -1.000000
  PIK THI S9 Z1 THI S1 Z1
  PIK GLA S9 Z1 GLA S1 Z1

ZOOM DATA
            POS 1         POS 2         POS 3
  WTW W1        1             0             0
  WTW W2        0             1             0
  WTW W3        0             0             1
  REF           1             2             3
  VUY F1     -0.1490E-08  -0.1490E-08  -0.1490E-08
  VLY F1     -0.03031     -0.03093     -0.03182
  VUY F2     -0.00072     -0.00216     -0.00225
  VLY F2     -0.02595     -0.02656     -0.02747
  VUY F3     -0.2980E-08  -0.00261     -0.5960E-08
  VLY F3     -0.01320     -0.01385     -0.1192E-07
  VUY F4     -0.00072     -0.00216     -0.00225
  VLY F4     -0.02595     -0.02656     -0.02747
  VUY F5     -0.2980E-08  -0.00261     -0.5960E-08
  VLY F5     -0.01320     -0.01385     -0.1192E-07
  VUX F1     -0.03234     -0.03197     -0.03152
  VLX F1     -0.03234     -0.03197     -0.03152
  VUX F2     -0.01943     -0.01916     -0.01884
  VLX F2     -0.02538     -0.02746     -0.02978
  VUX F3     -0.01104     -0.01112     -0.01123
  VLX F3     -0.1490E-08  -0.00184     -0.00395
  VUX F4     -0.02538     -0.02746     -0.02978
  VLX F4     -0.01943     -0.01916     -0.01884
  VUX F5     -0.1490E-08  -0.00184     -0.00395
  VLX F5     -0.01104     -0.01112     -0.01123
  CIR S6      0.28337      0.28269      0.28194

THIRD EMBODIMENT PRESCRIPTION PAGE 3 OF 4
FIG. 10C

This is a non-symmetric system. If elements with power are decentered or tilted, the first order properties are probably inadequate in describing the system characteristics.

```
              POS 1    POS 2    POS 3
INFINITE CONJUGATES
  EFL       3.5538    3.5879    3.6306
  BFL      -3.4155   -3.4492   -3.4915
  FFL       2.4637    2.4994    2.5437
  FNO       1.7918    1.8030    1.8173
AT USED CONJUGATES
  RED       1.0000    0.9996    0.9991
  FNO       3.0000    3.0000    3.0000
  OBJ DIS   1.0901    1.0901    1.0901
  TT        2.4811    2.4811    2.4811
  IMG DIS   0.0538    0.0538    0.0538
  OAL       1.3372    1.3372    1.3372
  PARAXIAL IMAGE
  HT        1.0000    0.9996    0.9991
  THI       0.1383    0.1371    0.1360
  ANG      10.1432   10.0973   10.0440
ENTRANCE PUPIL
  DIA       1.9834    1.9900    1.9978
  THI       4.7769    4.7990    4.8248
EXIT PUPIL
  DIA       3.0471    3.1048    3.1798
  THI      -8.8753   -9.0472   -9.2701
  STO DIA   0.5667    0.5654    0.5639
```

THIRD EMBODIMENT PRESCRIPTION PAGE 4 OF 4

FIG. 10D

COMPACT AND ATHERMAL VNIR/SWIR SPECTROMETER

FIELD OF THE DISCLOSURE

Embodiments relate to a spectrometer, and more particularly, to a compact athermal imaging spectrometer for VNIR/SWIR spectral range, and, even more particularly, to a compact and athermal Dyson type VNIR/SWIR Spectrometer working in the spectrum of VNIR/SWIR radiation.

BACKGROUND

Imaging spectroscopy in the visible and near infrared (VNIR) 400 nm-1000 nm and short wave infrared (SWIR) 1000 nm-2350 nm spectral ranges allows identifying potential targets as well as studying water and soil properties over large areas. NASA satellites carrying airborne hyperspectral imaging systems are used for of identifying a wide variety of surface materials by providing simultaneously many narrow, contiguous spectral bands and higher resolution reflectance spectra for every pixel in a spatial image.

Dyson type spectrometers are described in a paper "OPTICS FOR THE CANADIAN HYPERSPECTRAL MISSION (HERO)". Journal: Sixth International Conference on Space Optics, Proceedings of ESA/CNES ICSO 2006, held 27-30 Jun. 2006 at ESTEC, Noordwijk, The Netherlands. Edited by A. Wilson. ESA SP-621. European Space Agency, 2006. Published on CDROM, p. 8.1. This paper describes a pushbroom Dyson type spectrometer. The spectrometer consists of two spectral channels VNIR and SWIR. The covered band width (spectrum) is 450 nm-2500 nm. The spectrometer incorporates two different gratings spaced from each other by approximately 0.5 meter and two slits. Large volume is needed for spectrometer packaging. Dyson prism blocks make the system heavy. The FPA (focal plane array) is made for 30 μm pixel size. The spectrometer F# is 2.2.

Spectrometer thermal properties are extremely important for the remote sensing platform configuration and packaging. For temperature sensitive spectrometers, special motor adjusting focal plane array position according to the temperature change is required. That leads to the increase of the packaging envelope and weight of carrying on the airborne platform.

A VNIR/SWIR spectrometer is disclosed in Patent Application US 2014/0071449, Mar. 13, 2014 High Efficiency Multi-channel Spectrometer. The VNIR/SWIR Offner type spectrometer optical system requires substantial envelope and includes multiple mirror, beam splitter, and pair of diffraction gratings.

U.S. Pat. No. 8,520,204, Aug. 27, 2013, discloses a Dyson Type Imaging Spectrometer having Improved Image Quality and Low Distortion. The entry or exit port is located inside the prism (or hemispherical lens)—there is no access for maintenance. No spectral correction over the wide spectrum is performed.

Another spectrometer is disclosed in U.S. Pat. No. 7,609,381, Oct. 27, 2009 Compact High-Throughput Spectrometer apparatus for Hyperspectral Remote Sensing. Only LWIR or VNIR spectral bands may be used, the spectrometer does not feature a combined VNIR/SWIR channel. A single refractive material is used for the VNIR channel, and chromatic aberration is not corrected.

Yet another spectrometer is disclosed in U.S. Pat. No. 7,768,642, Wide Field Compact Imaging Catadioptric Spectrometer, Aug. 3, 2010. This patent describes a wide field LWIR spectrometer with a pupil lens for the wide field aberration correction in the LWIR spectral band.

Another spectrometer is disclosed in U.S. Pat. No. 6,980,295 issuing to Lerner on Dec. 27, 2005 and entitled Compact Catadioptric Imaging Spectrometer Utilizing Reflective Grating. Therein disclosed is an imaging spectrometer having an entrance slit, an aspheric lens, grating, and detector. The spectrometer is designed to accommodate LWIR band width 8-13.5 μm.

Yet another spectrometer is disclosed in U.S. Pat. No. 7,006,217 issuing to Lerner on Feb. 28, 2006 and entitled Compact Catadioptric Imaging Spectrometer Utilizing Immersed Gratings. Therein disclosed is a spectrometer having an entrance slit, a catadioptric lens, a grating that diffracts the light back to the catadioptric lens and a detector. The spectrometer is designed for LWIR band width.

Yet another spectrometer is disclosed in U.S. Pat. No. 8,339,600, Dec. 25, 2012; Dual Waveband Compact Catadioptric Imaging Spectrometer. The spectrometer incorporates ZnSe grating, a curved sapphire prism, and BaF2 catadioptric lens or dioptric lens with a mirror, the F# is 4.

Even though there has been substantial development in the field of spectrometers for hyperspectral imaging, there is a need for a compact athermal VNIR/SWIR hyperspectral imaging spectrometer. Specifically, there is a need to provide a compact and efficient VNIR/SWIR imaging spectrometer with low F# and wide field of view.

SUMMARY

An embodiment provides a compact and athermal VNIR/SWIR spectrometer comprising a slit; a diffraction grating; an optical system forming spectral components of radiation received by the slit; a plurality of focal plane arrays (FPAs). In embodiments, the spectrometer comprises the slit; a Mangin lens comprising partially reflective and partially refractive surface; a pupil lens; the diffraction grating; an aperture stop; a corrector lens; a beam splitter; a first field lens; a second field lens; a SWIR FPA; and a VNIR FPA; wherein the slit, Mangin lens, pupil lens, diffraction grating, corrector lens, beam splitter, field lenses and FPAs are positioned wherein the slit transmits radiation to a reflective part of the Mangin lens surface and the reflective part directs radiation onto the pupil lens, the pupil lens directs radiation onto the diffraction grating, the diffraction grating diffracts radiation in the SWIR spectrum in a first diffraction order and diffracts radiation in the VNIR spectrum in a second diffraction order and directs radiation onto the pupil lens, the pupil lens directs the SWIR and the VNIR radiation onto the refractive part of the Mangin lens, the Mangin lens directs radiation onto the corrector lens, the corrector lens directs radiation onto the beam splitter, the beam splitter having a coating and transmits the SWIR radiation onto the first field lens and the beam splitter reflects the VNIR radiation onto the second field lens, the first field lens forming an image of the slit at the SWIR FPA and the second field lens forming an image of the slit at the VNIR FPA. In other embodiments, the grating comprises an immersion grating. In subsequent embodiments the grating comprises a reflective grating. For additional embodiments the diffraction grating diffracts SWIR radiation in a first order and VNIR radiation in a second order. In another embodiment, the density of the diffraction grating is 45 grooves/mm. For a following embodiment the aperture stop is located at the grating. In subsequent embodiments the beam splitter transmits SWIR radiation and reflects VNIR radiation. In additional embodiments thermal defocus does not exceed depth of focus in a temperature range from −10° C. to 40° C. for both SWIR and VNIR spectrums. In included embodiments the pupil lens is a double path lens. In yet further embodiments the length of the slit is 1.36 inches. In related embodiments the Mangin lens has a positive optical power. For further embodiments the pupil lens has a negative optical power. In ensuing embodiments the diffraction grating has a positive optical power.

Another embodiment provides a compact VNIR/SWIR Spectrometer comprising a slit; a Mangin lens comprising partially reflective and partially refractive surface; a pupil lens; a diffraction grating; an aperture stop; a first corrector lens; a second corrector lens; a single SWIR/VNIR FPA; the slit, Mangin lens, pupil lens, diffraction grating, corrector lenses and FPA are positioned wherein the slit transmits radiation to the reflective part of the Mangin lens surface and the reflective part directs radiation onto the pupil lens, the pupil lens directs radiation onto the diffraction grating, the diffraction grating diffracts radiation in both the SWIR and the VNIR spectrums in a first diffraction order and directs radiation onto the pupil lens, the pupil lens directs radiation onto the refractive part of the Mangin lens, the Mangin lens directs radiation onto the first corrector lens, the first corrector lens directs radiation onto the second corrector lens, the second corrector lens forms image of the slit at the SWIR/VNIR FPA. For yet further embodiments, the grating comprises an immersion grating. For more embodiments, the grating comprises a reflective grating. In continued embodiments, the diffraction grating diffracts both SWIR and VNIR radiation in a first order. For additional embodiments, the aperture stop is located at the grating.

A yet further embodiment provides a compact SWIR spectrometer comprising a slit; a Mangin lens comprising partially reflective and partially refractive surface; a pupil lens; a diffraction grating; an aperture stop; a first corrector lens; a second corrector lens; a single SWIR FPA; the slit, Mangin lens, pupil lens, diffraction grating, corrector lenses and FPA are positioned wherein the slit transmits radiation to the reflective part of the Mangin lens surface and the reflective part directs radiation onto the pupil lens, the pupil lens directs radiation onto the diffraction grating, the diffraction grating diffracts radiation in the SWIR spectrum in a first diffraction order and directs radiation onto the pupil lens, the pupil lens directs radiation onto the refractive part of the Mangin lens, the Mangin lens directs radiation onto the first corrector lens, the first corrector lens directs radiation onto the second corrector lens, the second corrector lens forming an image of the slit at the SWIR FPA.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIGS. 4A-D represent the prescription of the first embodiment of a Compact and Athermal VNIR/SWIR Dyson Spectrometer configured in accordance with an embodiment.

FIGS. 7A-D represent the prescription of the second embodiment of a Compact and Athermal VNIR/SWIR Dyson Spectrometer configured in accordance with an embodiment.

FIGS. 10A-D represent the prescription of the third embodiment of a Compact and Athermal VNIR/SWIR Dyson Spectrometer configured in accordance with an embodiment.

Figure 1:
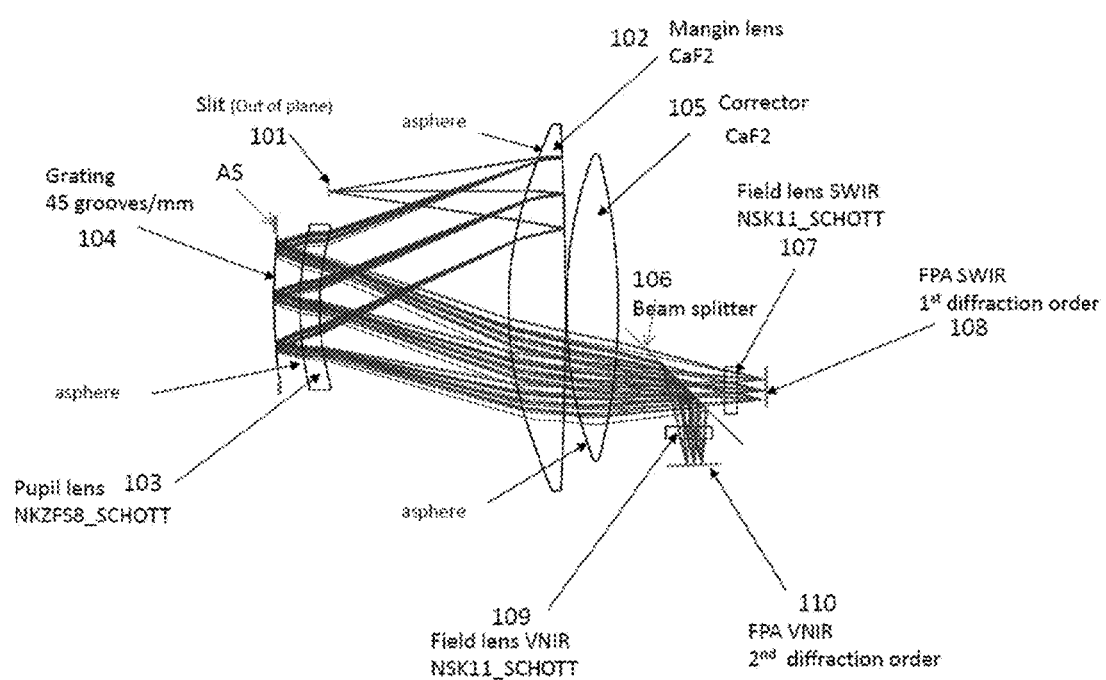
FIG. 1 illustrates ray tracing for a first embodiment of a Compact and Athermal VNIR/SWIR Dyson Spectrometer.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

A compact and athermal Dyson type VNIR/SWIR spectrometer may be used for military and commercial applications. It is very compact and low-weight, and provides excellent spectral resolution in both SWIR and VNIR spectrums. Embodiments can be used for reconnaissance and surveillance purposes. The spectrometer fits existing airborne platforms. Spectrometer embodiments allow implementation of spectral-spatial models for a more accurate segmentation and classification of the images of targets/objects of interest.

In a first embodiment of the invention, a compact and athermal VNIR/SWIR Dyson spectrometer includes a spherical diffraction grating, a pupil lens, a Mangin lens, a corrector lens, a beam splitter, two field lenses and two focal plane arrays (FPA) for VNIR and SWIR spectral channels. Accordingly it is an object of this embodiment to incorporate both VNIR and SWIR hyperspectral components. It is an advantage of this embodiment that it is very compact. It is another advantage of this embodiment that the optical system is corrected for chromatism. It is another advantage of this embodiments that field of view is large. It is another advantage of this embodiment that F# is low. It is another advantage of this embodiment that spectrometer is athermal.

In a second embodiment, a spectrometer includes a diffraction grating, a pupil lens, a Mangin lens, two corrector lenses and FPA. Both SWIR and VNIR hyperspectral components are incorporated. It is an advantage of a second embodiment that F# is low. It is a feature of this embodiment that one FPA is used for both VNIR and SWIR spectral components. It is a feature of second embodiment that both VNIR and SWIR spectral components are imaged onto one FPA.

In a third embodiment only the SWIR spectral component is used. The spectrometer includes a diffraction grating, a pupil lens, a Mangin lens, two corrector lenses and FPA. It is an advantage of third embodiment that spectrometer is very compact. It is an advantage of this embodiment that F# is low.

It is a feature of embodiments that a field lens is placed adjacent the FPA for image curvature correction. It is another feature of embodiments that the balancing of powers of the lens elements and glass dispersions makes possible the chromatic correction in both SWIR and VNIR spectral regions.

These and other objects, advantages, and features will become readily apparent in view of the following more detailed description.

FIG. 1 illustrates the configuration and ray trace of a first embodiment of the present invention. Dyson type spectrometer 100 includes in direction of ray trace from the slit to the FPA: slit 101, Mangin lens 102, pupil lens 103, diffraction grating 104, corrector lens 105, beam splitter 106, field lens 107, and FPA 108 for SWIR spectral channel and field lens 109 and FPA 110 for the VNIR spectral channel.

Specifications for the performance are as follows:
Total WL range 2.35-0.4 µm
WL SWIR: 2.35 µm-1 µm
WL VNIR: 0.9 µm-0.5 µm (0.4 µm considered)
Detector 27 µm pixel
FOV +/−1°
Temperature range −10° C. to 40° C.
Number of spatial and spectral channels:
SWIR: 1280 spatial×144 spectral, 1.36" spatial×0.153" spectral
VNIR: 1280 spatial×96 spectral, 1.36" spatial×0.102" spectral
Spectral resolution: SWIR 9.4 nm/pixel VNIR 5.2 nm/pixel MTF requirements

| SWIR | 9.25 cy/mm | 0.85 | 0.85 | 0.85 |
| SWIR | 18.5 cy/mm | 0.70 | 0.70 | 0.70 |
| VNIR | 9.25 cy/mm | 0.80 | 0.80 | 0.80 |
| VNIR | 18.5 cy/mm | 0.60 | 0.60 | 0.60 |

Smile, k-stone<0.2 pixel TIR

VNIR/SWIR radiation coming from the object/target is collected by the fore optics onto the spectrometer slit 101. Slit 101 long side is out of plane of the drawing and is perpendicular to the scan plane. The length of the slit is 1.36 inches. Radiation transmitted by the slit 101 is directed onto the Mangin lens 102 which has a positive optical power. Radiation is refracted by the first surface of the Mangin lens 102, then is reflected from the reflective part of the second surface of the Mangin lens and then the second time is refracted by the first surface of the Mangin lens and then is directed through the pupil lens 103, which has a negative optical power, onto the diffraction grating 104. Aperture stop AS is located at the grating 104. Reflective grating 104 has a positive optical power and diffracts the radiation in VNIR/SWIR spectral range into plurality of very narrow spectral bands. Grating 104 is made in a way that VNIR radiation is diffracted in the second diffraction order and SWIR radiation is diffracted in the first diffraction order. Spectral resolution is 5.2 nm in VNIR spectrum and 9.5 nm in SWIR spectrum. Diffracted radiation converged by the diffraction grating 104 goes along a second path through the pupil lens and then goes third time through the first refractive surface of the Mangin lens and refractive part of the Mangin lens' second surface. Still converged radiation is directed by the corrector lens 105, which has a positive optical power, onto beam splitter 106 which has a special coating providing reflection of VNIR spectral radiation and transmission of SWIR spectral radiation. Transmitted through the beam splitter 106, SWIR radiation is collected by the field lens 107 onto the SWIR FPA 108. Field lenses 107 and 109 have positive optical powers. Reflected from the beam splitter, VNIR radiation is focused by the field lens 109 onto VNIR FPA 110.

Monochromatic and chromatic aberrations depend on the heights and angles of rays at the optical element surface and the refraction index of the material. These aberrations also depend on the shape of the optical element, and on its location with respect to the aperture stop.

For the wide field across the numerical aperture aberrational correction, a special balance of the optical powers of the components and a certain relative orientation the components with respect to each other is required. The Mangin lens 102 is shaped as a double convex lens, the pupil lens 103 is shaped as a negative meniscus lens whose convex surface faces toward the diffraction grating 104, the diffraction grating 104 is shaped as a concave reflective surface facing the incoming beam, the corrector lens 105 is shaped as a double convex lens and the field lenses 107 and 109 are shaped as double convex lenses. The Mangin lens 102 aberrational contribution to wide beam low order spherical aberration is compensated by the corrector lens 105, the cross field aberration are corrected by the pupil lens 103; that allows the increase of the slit 101 length and leads to the more efficient system. The field lenses 107 and 109 correct for the field curvature along the slit.

For the residual high order spherical aberration and coma correction, first surface of the Mangin lens, second surface of the pupil lens, diffraction grating surface and second surface of the corrector lens are made aspherical, according to the ray tracing from the slit to the FPA.

In order for chromatic correction in VNIR-SWIR spectrum, a special combination of all components materials is required. The contribution of the optical element to the total axial color is proportional to the square of axial marginal ray height at the lens, its optical power, and the reciprocal of the Abbe number of the lens material. The Abbe number is a measure of the material's light dispersion in relation to the refractive index. The Abbe number $V_d$ is given by:

$$V_d = (n_d - 1)/(n_{F'} - n_{C'})$$

where $n_d$ is the index of refraction of the glass at the wavelength of the helium line d (587.6 nm), $n_{F'}$ is the index of refraction at the blue cadmium line F' (479.99 nm), and $n_{C'}$ is the index of refraction at the red cadmium line C' (643.85 nm). Accordingly, the smaller the value of $V_d$, the greater the chromatic dispersion of the glass.

In order for chromatic correction in VNIR-SWIR spectrum, a special combination of all components' material properties is required. Mangin lens 102 is made out of CaF2, pupil lens 103 is made of NKZFS8 Schott glass, Corrector lens 105 is made of CaF2 and field lenses 107 and 109 are made of NSK11 Schott glass.

The mutual combination of optical elements' materials refractive indices and Abbe numbers provides monochromatic and achromatic correction of the spectrometer 100.

When ambient temperature changes, the shapes and positions of optical elements will change, and the focal length and position of an image formed by the lens will change as well. This is caused by glass expansion and changes in the glass refractive index with temperature. This dependence on temperature can have a significant impact on lens performance. So as to compensate for these changes, either the focal plane array has to be adjusted along the optical axis, or some elements inside the lens have to be moved. However, this approach is highly undesirable, because additional electronics and software are needed to perform and monitor the necessary adjustments.

On the other hand, a lens does not need thermal adjustment when the change of the focus position within the required temperature range stays inside the depth of focus of the lens. The diffraction depth of focus (DOF) is defined by:

$$DOF = \lambda / NA^2$$

where $\lambda$ is the wavelength and NA is numerical aperture at the image space For $\lambda$=1000 nm and F#3.3 (NA=0.1515): DOF≅0.0435 mm.

Therefore, in this example, if the lens design meets a requirement that all changes of the focus position over a specified range of temperature changes are inside 0.0435 mm, no refocusing is required.

Temperature change also causes the expansion of the optical elements. The Opto-thermal expansion coefficient $\beta$ of an optical element is a property of the glass material, and it does not depend on the focal length or shape factor of the individual optics. For a single optical element:

$$\beta = \alpha (dn/dT)/(n-1)$$

Where:
$\alpha$=the thermal expansion coefficient of the glass
n=the refractive index of the glass at the current wavelength
T=ambient temperature Contribution of thermal expansion of the optical elements glass compare to the refractive index change with temperature is rather small and usually does not have a noticeable effect DOF change.

The mutual combination of changes of refractive index with temperature of the optical elements provides athermalization of the spectrometer 100.

In the embodiment of FIG. 1, the optical elements satisfy the following relations:

$1 < F'/F'_{ML} < 1.45$ $1.3 < F'/F'_C < 1.75$ $-0.55 < F'/F'_{PL} < -0.35$ $2.5 < F'/F'_{DG} < 3.8$ $0.35 < F'/F'_{FL} < 0.75$ $2.5 < F'/OAL < 3.5$ $7.5 < F'/DEC < 8.5$ $2.5 < V_{ML}/V_{PL} < 3$ $0.8 < V_{ML}/V_C < 1.2$ $1.3 < V_{ML}/V_{FL} < 1.75$ $-4.8 < dn/dT_{ML}/dn/dT_{PL} < -3.4$ $0.8 < dn/dT_{ML}/dn/dT_C < 1.2$ $-4.8 < dn/dT_{ML}/dn/dT_{FL} < 3.3$

Wherein:
F' is the focal length of the spectrometer 100
$F'_{ML}$ is the focal length of the Mangin lens 102
$F'_C$ is the focal length of the corrector lens 105
$F'_{PL}$ is the focal length of the pupil lens 103
$F'_{DG}$ is the focal length of the diffraction grating 104
$F'_{FL}$ is the focal length of the field lenses 107 and 109
OAL is the overall length of the spectrometer 100 along the optical axis from the slit 101 to the FPA 108
DEC is the decentration of the slit 101 with respect to the optical axis in the direction perpendicular to the length of the slit
$V_{ML}$ is the Abbe number for the current wave length of the glass of the Mangin lens 102
$V_{PL}$ is the Abbe number for the current wave length of the glass of the pupil lens 103
$V_C$ is the Abbe number for the current wave length of the corrector lens 105
$V_{FL}$ is the Abbe number for the current wave length of the glass of the field lenses 107 and 109
$dn/dT_{ML}$ is the refractive index change with temperature for the Mangin lens 102
$dn/dT_{PL}$ is the refractive index change with temperature for the pupil lens 103
$dn/d_{TC}$ is the refractive index change with temperature for the corrector lens 105
$dn/dT_{FL}$ is the refractive index change with temperature for the field lenses 107 and 109

The selection of the optical powers of the optical elements, the selection of the refractive indices and the Abbe numbers as well as do/dT values of the used glasses, provides a compact wide field, low NA and athermal spectrometer. The defocusing caused by changes in temperature is less than the depth of focus of the lens.

Figure 2:
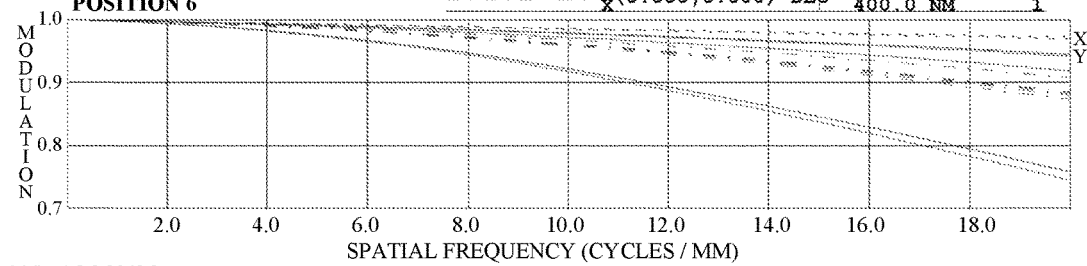
FIG. 2 shows MTF curves for the first embodiment of a Compact and Athermal VNIR/SWIR Dyson Spectrometer configured in accordance with an embodiment.
Figure 2:
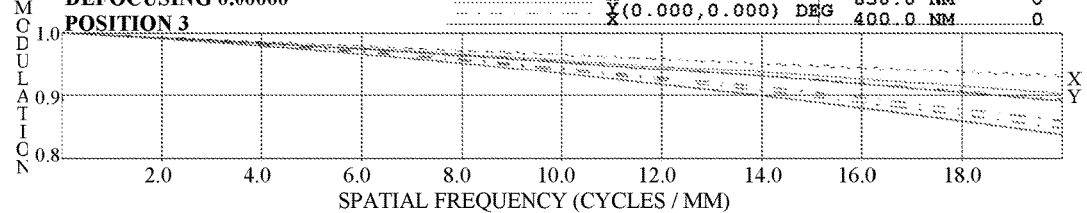
Figure 2:
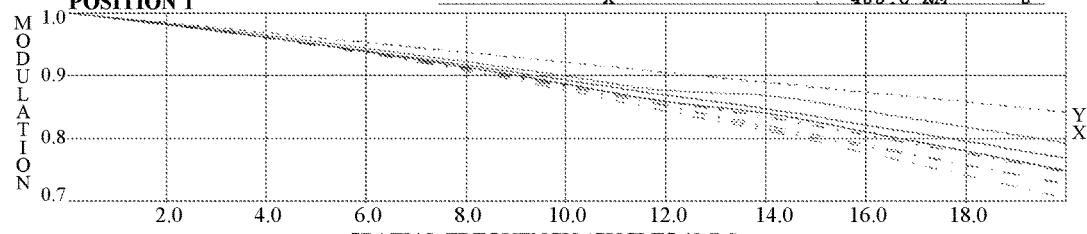

FIG. 2 presents MTF data for the embodiment of FIG. 1. The field is flat and polychromatic MTF shows good contrast over the entire field for F#3.3.

Figure 3:
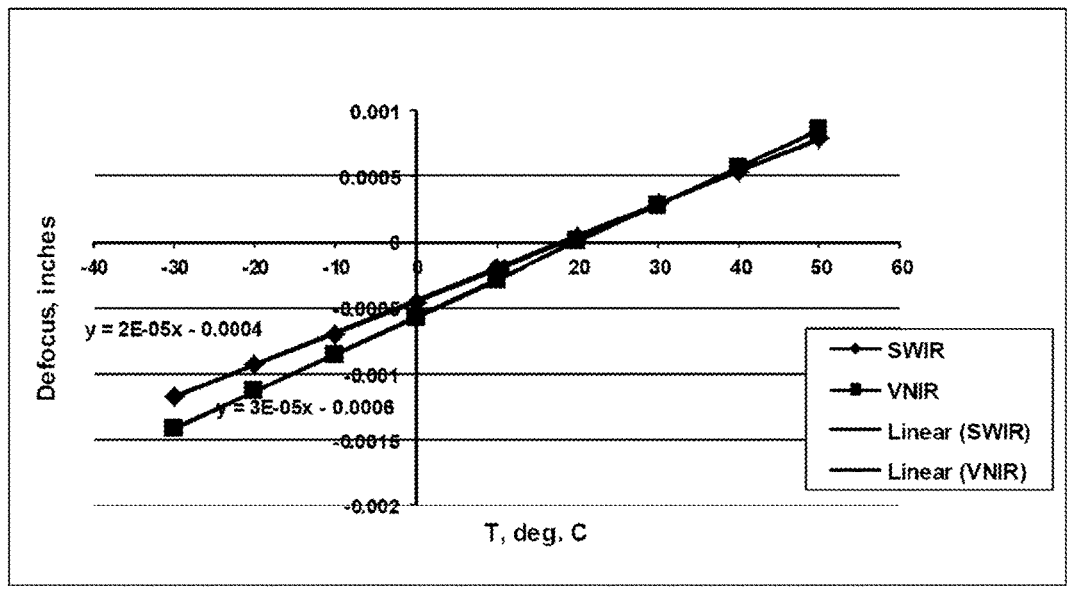
FIG. 3 illustrates thermal analysis data for the first embodiment of a Compact and Athermal VNIR/SWIR Dyson Spectrometer configured in accordance with an embodiment.

FIG. 3 presents defocus of the first embodiment with respect to the temperature change. For both VNIR and SWIR channels, defocus is within the depth of focus for a specified range of −10° C. to +40° C.

Spectral and smile distortion are less than 0.2 pixel.

FIG. 4A-D present the prescription of the first embodiment for both VNIR and SWIR channels.

Figure 5:
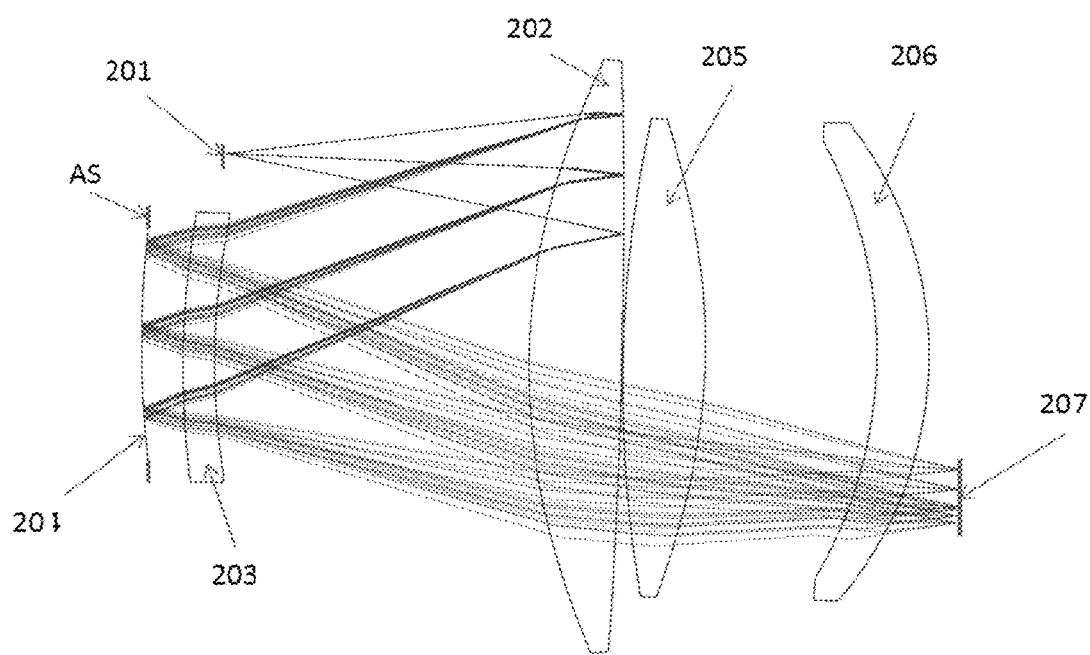
FIG. 5 illustrates ray tracing for a second embodiment of a Compact and Athermal VNIR/SWIR Dyson Spectrometer.

FIG. 5 is an illustration 500 of the second embodiment of the VNIR/SWIR spectrometer. Spectrometer 200 consists of (by the ray trace from the slit to the FPA): slit 201, Mangin lens 202, pupil lens 203, diffraction grating 204, first corrector lens 205, second corrector lens 206 and FPA 207. Only one diffraction order is used for both VNIR and SWIR channels and hyperspectral images of the slit are analyzed only at one FPA plane.

VNIR/SWIR radiation coming from the object/target is collected by the fore optics onto the spectrometer slit 201. Slit 201 long side is out of plane of the drawing and is perpendicular to a scan plane. Length of the slit is 1.36 inches. Radiation transmitted by the slit 201 is directed onto the Mangin lens 202 which has a positive optical power.

Radiation is refracted by the first surface of the Mangin lens 202, then is reflected from the reflective part of the second surface of the Mangin lens and then a second time is refracted by the first surface of the Mangin lens and then is directed through the pupil lens 203, which has a negative optical power, onto the spherical diffraction grating 204. Aperture stop AS is located at the grating 204. Reflective grating 204 has a positive optical power and diffracts the radiation in the VNIR/SWIR spectral range into a plurality of very narrow spectral bands, at that, only first order of diffraction is used. Diffracted radiation converged by the diffraction grating 204 goes by a second path through the pupil lens and then goes a third time through the first refractive surface of the Mangin lens 202 and refractive part of the Mangin lens' second surface. Still converged radiation is directed by the first corrector lens 205, which has a positive optical power, onto the second corrector lens 206 which has a positive optical power. Second corrector lens 206 focuses all spectral components of the slit 201 onto FPA 207. The spectral range for the VNIR channel is 400 nm-900 nm and the spectral range for the SWIR channel is 1000 nm-2400 nm.

The Mangin lens 202 is shaped as a double convex lens and the first surface of the Mangin lens is formed aspherical, the pupil lens 203 is shaped as a negative meniscus lens whose convex surface faces toward the diffraction grating 204, the diffraction grating 204 is shaped as a concave reflective surface facing the incoming beam, the first corrector lens 205 is shaped as a double convex lens and the second corrector lens 206 is shaped as a positive meniscus lens, whose convex surface faces the FPA. First surface of the Mangin lens 202, second surface of the pupil lens 203, first surface of the first corrector lens 205 and second surface of the second corrector lens 206 are formed as aspherical. Corrector lenses 205 and 206 compensate for the spherical aberration, coma, and astigmatism introduced by the Mangin lens 202 and grating 203. Residual high order spherical aberration and coma are corrected by the aspherical surfaces of the Mangin lens 202 and pupil lens 203, and residual high order astigmatism and field curvature are corrected by the first aspherical surface of the corrector lens 205 and second aspherical surface of the corrector lens 206. For chromatic aberration correction, the Mangin lens 202 is made of CaF2, pupil lens 203 is made of glass NKZFS8 Schott, first corrector lens 205 is made of NKZFS8 Schott and second corrector lens 206 is made of NSK11 Schott glass.

The mutual combination of optical components optical powers, glasses' refractive indices and Abbe numbers of the optical elements provide monochromatic and chromatic correction of the spectrometer 200.

In the embodiment of FIG. 5, the optical elements parameters satisfy the following relations:

$$0.95 < F'_{200}/F'_{ML202} < 1.55$$

$$-0.45 < F'_{200}/F'_{PL203} < -0.2$$

$$1.5 < F'_{200}/F'_{C205} < 1.85$$

$$0.35 < F'_{200}/F'_{C206} < 0.6$$

$$2.15 < F'_{200}/F'_{DG204} < 2.65$$

$$2.25 < F'/OAL_{200} < 2.8$$

$$7.75 < F'_{200}/DEC_{200} < 8.6$$

$$2.6 < V_{ML202}/V_{PL203} < 3.5$$

$$2.6 < V_{ML202}/V_{C205} < 3.5$$

$$1.2 < V_{ML202}/V_{C206} < 2$$

Wherein:

$F'_{200}$ is the focal length of the spectrometer 200
$F'_{ML202}$ is the focal length of the Mangin lens 202
$F'_{C205}$ is the focal length of the first corrector lens 205
$F'_{C206}$ is the focal length of the second corrector lens 206
$F'_{PL203}$ is the focal length of the pupil lens 203
$F'_{DG204}$ is the focal length of the diffraction grating 204
$OAL_{200}$ is the overall length of the spectrometer 200 along the optical axis from the slit 201 to the FPA 207
$DEC_{200}$ is the decentration of the slit 201 with respect to the optical axis in the direction perpendicular to the length of the slit
$V_{ML202}$ is the Abbe number for the current wave length of the glass of the Mangin lens 202
$V_{PL203}$ is the Abbe number for the current wave length of the glass of the pupil lens 203
$V_{C205}$ is the Abbe number for the current wave length of the first corrector lens 205
$V_{C206}$ is the Abbe number for the current wave length of the second corrector lens 206

The selection of the optical powers of the optical elements, the selection of the refractive indices and the Abbe numbers of the used glasses provides a wide field, low NA spectrometer utilizing only one FPA for spectral components of both VNIR and SWIR channels.

Figure 6:
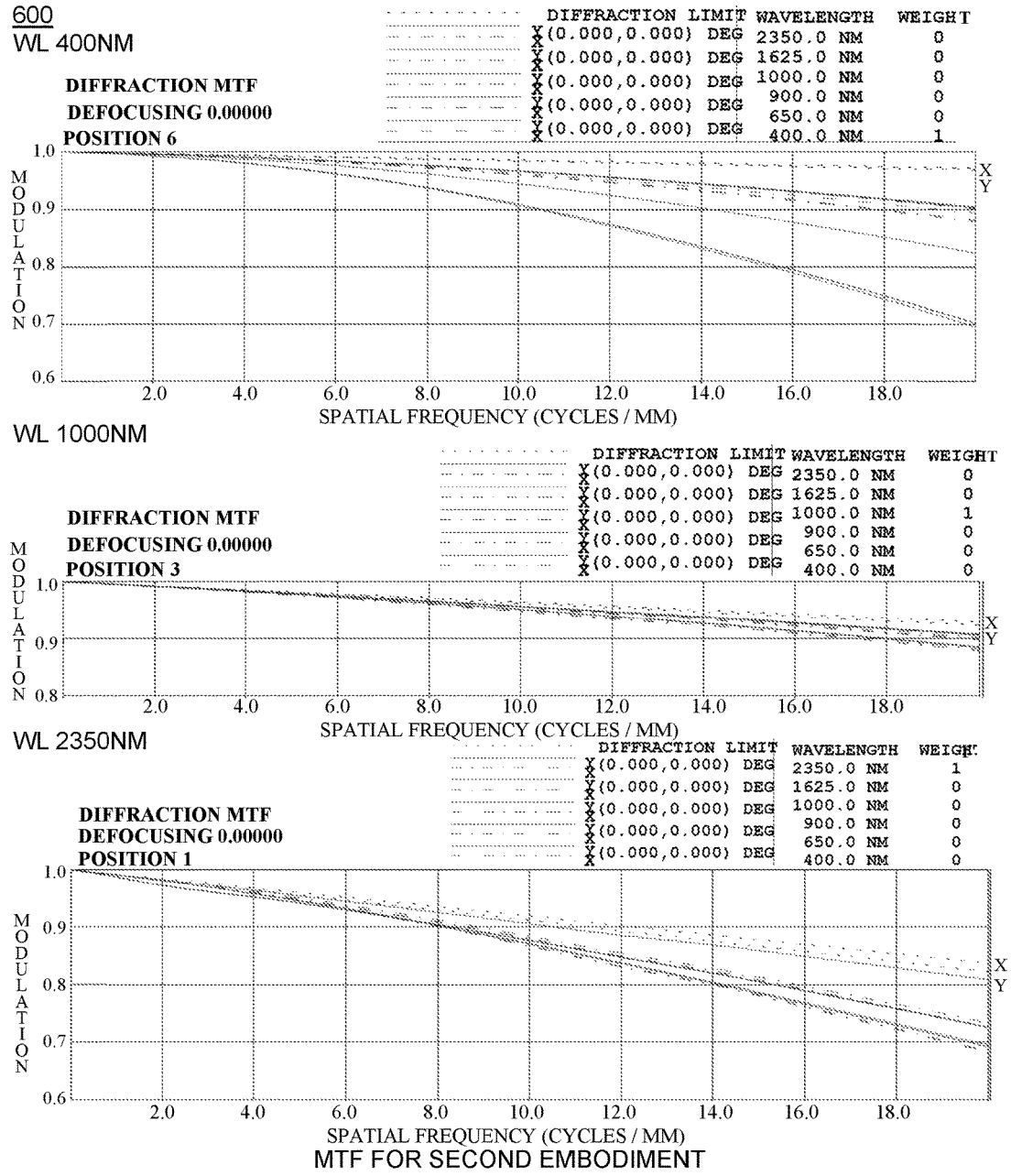
FIG. 6 shows MTF curves for the second embodiment of a Compact and Athermal VNIR/SWIR Dyson Spectrometer configured in accordance with an embodiment.

FIG. 6 presents MTF data 600 for the embodiment of FIG. 5. Polychromatic MTF shows good contrast over the entire field for F#3.3.

Spectral and smile distortion are less than 0.2 pixel.

FIG. 7A-D present the prescription of the second embodiment.

Figure 8:
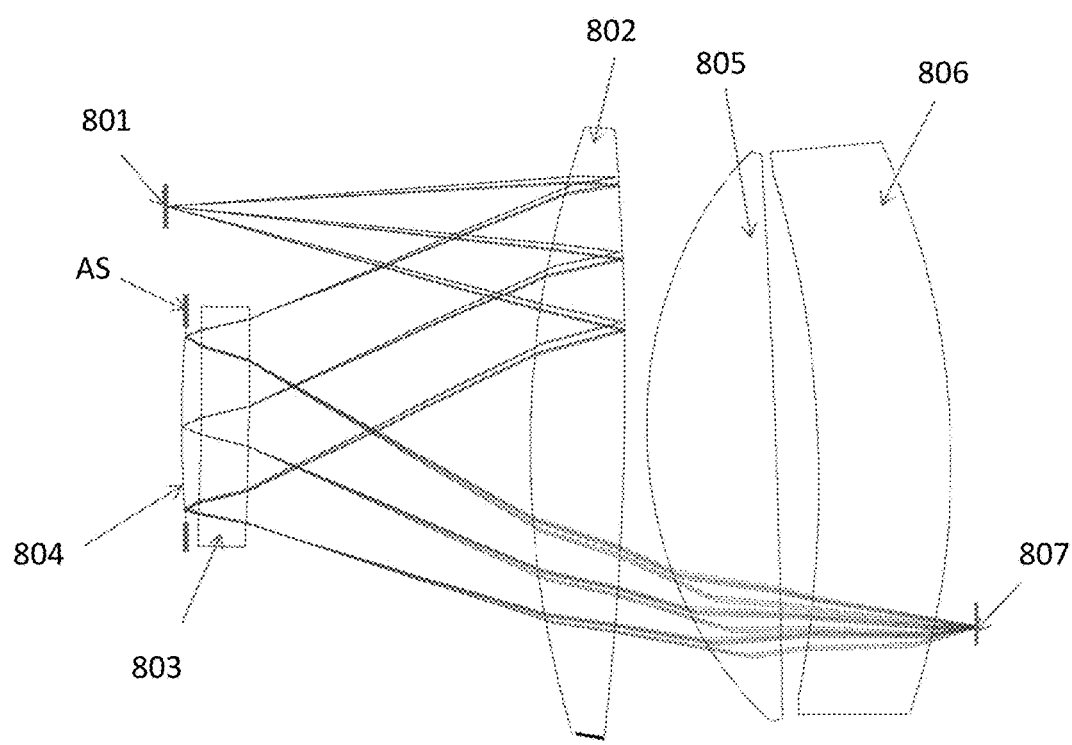
FIG. 8 illustrates ray tracing for a third embodiment of a Compact and Athermal VNIR/SWIR Dyson Spectrometer.

FIG. 8 is an illustration of a third embodiment 800 of the present invention. Spectrometer 800 consists of, in the order of the ray trace from the slit to the FPA: slit 801, Mangin lens 802, pupil lens 803, diffraction grating 804, first corrector lens 805, second corrector lens 806 and FPA 807. Only SWIR radiation is accepted by spectrometer 800 and only SWIR hyperspectral images of the slit 801 are analyzed only at the FPA 807.

SWIR radiation coming from the object/target is collected by the fore optics onto the spectrometer slit 801. Slit 801 long side is out of plane of the drawing and is perpendicular to a scan plane. Length of the slit is 0.96 inches. Radiation transmitted by the slit 801 is directed onto the Mangin lens 802 which has a positive optical power. Radiation is refracted by the first surface of the Mangin lens 802, then is reflected from the reflective part of the second surface of the Mangin lens and then second time is refracted by the first surface of the Mangin lens and then is directed through the pupil lens 803, which has a negative optical power, onto the spherical diffraction grating 804. Aperture stop AS is located at the grating 804. Reflective grating 804 has a positive optical power and diffracts the radiation in the SWIR spectral range into a plurality of very narrow spectral bands, at that, only first order of diffraction is used. Diffracted radiation converged by the diffraction grating 804 goes by a second path through the pupil lens 803 and then goes a third time through the first refractive surface of the Mangin lens 802 and refractive part of the Mangin lens' second surface. Still converged radiation is directed by the first corrector lens 805, which has a positive optical power, onto the second corrector lens 806 which has a positive optical power. Second corrector lens 806 focuses all spectral components of the slit 801 onto FPA 807. Spectral range for the SWIR channel is 1000 nm-1700 nm. The Mangin lens 802 is shaped as a double convex lens, the pupil lens 803 is shaped as a negative meniscus lens whose convex surface faces toward the Mangin lens 802, the diffraction grating 804 is shaped as a concave reflective surface facing the incoming beam, the first corrector lens 805 is shaped as a double convex lens and the second corrector lens 806 is shaped as a positive meniscus lens, whose convex surface faces FPA. First surface of the Mangin lens 802, second surface of the pupil lens 803, first surface of the first corrector lens 805 and second surface of the second corrector lens 806 are formed as aspherical. The diffraction grating 803 is tilted contra clock direction with respect to the optical axis of the Mangin lens by about 1 degree, around the axis perpendicular to the optical axis (tilt is in the plane of the drawing of FIG. 8), in order to compensate for smile distortion and astigmatism. Corrector lenses 805 and 806 compensate for the wide beam aberrations of spherical and coma introduced by the Mangin lens 802 and grating 803. Residual high order aberration is corrected by the aspherical surfaces of the Mangin lens 802 and pupil lens 804, and residual high order astigmatism and field curvature are corrected by the first aspherical surface of the corrector lens 805 and second aspherical surface of the corrector lens 806. For chromatic aberration correction, the Mangin lens 802 is made of CaF2, pupil lens 803 is made of glass NKZFS8 Schott, first corrector lens 805 is made of SFPL53 Ohara and second corrector lens 806 is made of STIH53 Ohara glasses.

The configuration of the spectrometer components, mutual combination of optical powers, glasses refractive indices and Abbe numbers provide the monochromatic and polychromatic aberrational correction of the spectrometer 800.

In the embodiment of FIG. 8, the optical elements parameters satisfy the following relations:

$$0.55 < F'_{800}/F'_{ML802} < 0.85$$

$$-0.1 < F'_{800}/F'_{PL803} < -0.055$$

$$0.9 < F'_{800}/F'_{C805} < 1.4$$

$$0.3 < F'_{800}/F'_{C806} < 0.6$$

$$1.5 < F'_{800}/F'_{DG804} < 2.5$$

$$1.2 < F'_{800}/OAL_{800} < 1.6$$

$$2.5 < F'_{800}/DEC_{800} < 4.5$$

$$0.25° \beta_{804} < 4°$$

$$2.4 < V_{ML802}/V_{PL803} < 3.5$$

$$0.8 < V_{ML802}/V_{C805} < 1.2$$

$$3.5 < V_{ML802}/V_{C806} < 4.5$$

Wherein:
$F'_{800}$ is the focal length of the spectrometer 800
$F'_{ML802}$ is the focal length of the Mangin lens 802
$F'_{C805}$ is the focal length of the first corrector lens 805
$F'_{C806}$ is the focal length of the second corrector lens 806
$F'_{PL803}$ is the focal length of the pupil lens 803
$F'_{DG804}$ is the focal length of the diffraction grating 804
$OAL_{800}$ is the overall length of the spectrometer along the optical axis from the slit 801 to the FPA 807
$DEC_{800}$ is the decentration of the slit 801 with respect to the optical axis in the direction perpendicular to the length of the slit $\beta_{804}$ is diffraction grating 804 counter-clockwise rotation angle, around the axis perpendicular to the optical axis of Mangin lens 802

$V_{ML802}$ is the Abbe number for the current wave length of the glass of the Mangin lens 802

$V_{PL803}$ is the Abbe number for the current wave length of the glass of the pupil lens 803

$V_{C805}$ is the Abbe number for the current wave length of the glass of the first corrector lens 805

$V_{C806}$ is the Abbe number for the current wave length of the glass of the second corrector lens 806

The selection of the optical powers of the optical elements, the selection of the refractive indices and the Abbe numbers of the used glasses, provides a very compact, low NA spectrometer with F#3, working in SWIR spectrum.

Figure 9:
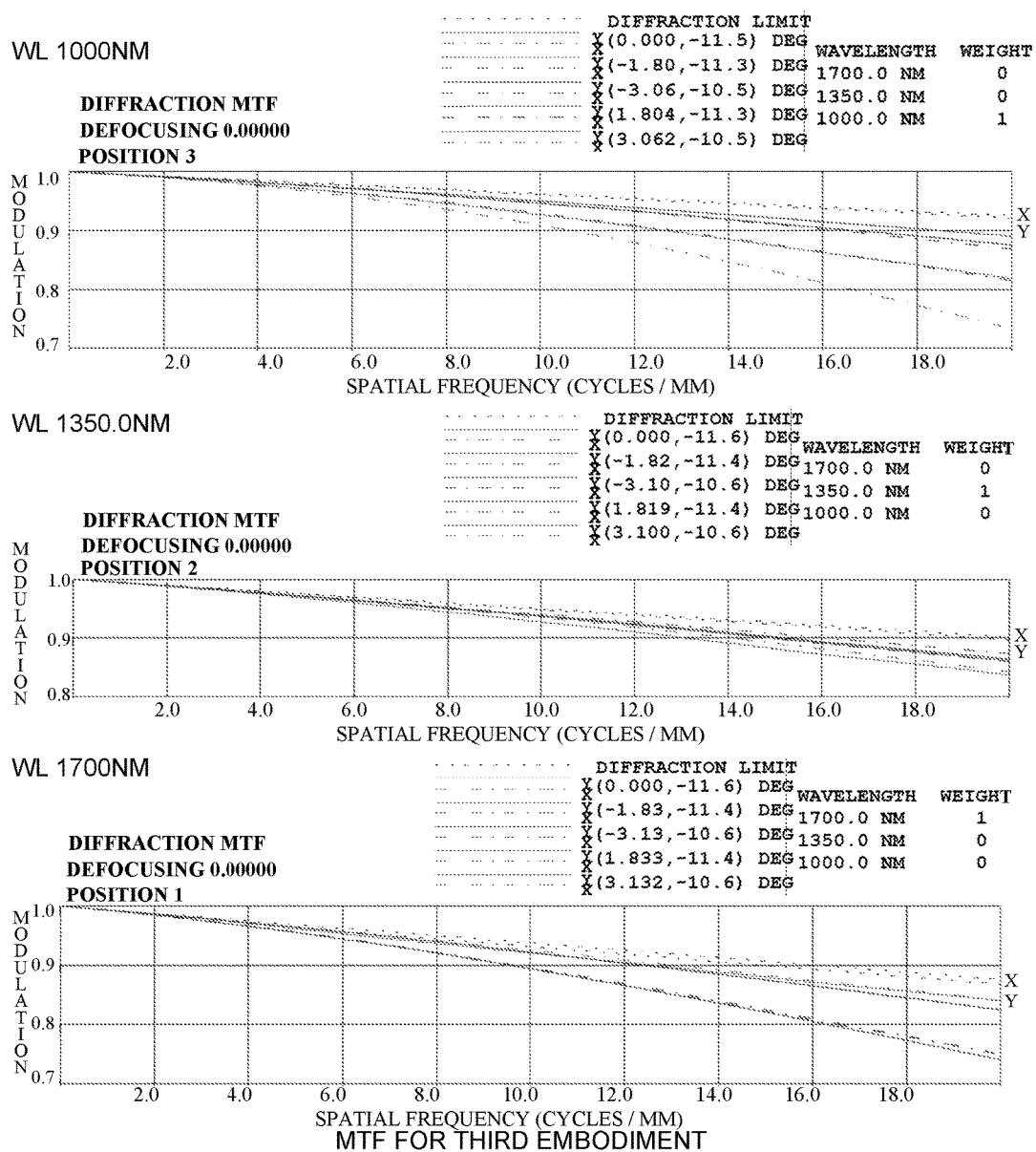
FIG. 9 shows MTF curves for the third embodiment of a Compact and Athermal VNIR/SWIR Dyson Spectrometer configured in accordance with an embodiment.

MTF data for the embodiment of FIG. 8 is presented in FIG. 9. Polychromatic MTF shows good contrast over the entire field for F#3.3.

Spectral and smile distortion are less than 0.2 pixel.

FIGS. 10A-D present the prescription of the third embodiment.

Example elements for the first embodiment follow. A compact and Athermal VNIR/SWIR Spectrometer as in the first embodiment wherein: said corrector lens has a positive optical power. A compact and Athermal VNIR/SWIR Spectrometer as in the first embodiment wherein: said first field lens positioned at SWIR FPA has a positive optical power. A compact and athermal VNIR/SWIR Spectrometer as in the first embodiment wherein: said second field lens positioned at SWIR FPA has a positive optical power. A compact and athermal VNIR/SWIR Spectrometer as in the first embodiment wherein: said Mangin lens is shaped as a double convex lens. A compact and athermal VNIR/SWIR Spectrometer as in the first embodiment wherein: said pupil lens is shaped as a negative meniscus lens whose convex surface faces toward said diffraction grating. A compact and athermal VNIR/SWIR Spectrometer as in the first embodiment wherein: said diffraction grating is shaped as a concave reflective surface facing the incoming beam. A compact and athermal VNIR/SWIR Spectrometer as in the first embodiment wherein: said corrector lens is shaped as a double convex lens. A compact and athermal VNIR/SWIR Spectrometer as in the first embodiment wherein: said first field lens positioned at SWIR FPA is shaped as a double convex lens. A compact and athermal VNIR/SWIR Spectrometer as in the first embodiment wherein: said second field lens positioned at VNIR FPA is shaped as a double convex lens. A compact and athermal VNIR/SWIR Spectrometer as in the first embodiment wherein: first surface of said Mangin lens is formed aspherical. A compact and athermal VNIR/SWIR Spectrometer as in the first embodiment wherein: second surface of said pupil lens is formed aspherical. A compact and athermal VNIR/SWIR Spectrometer as in the first embodiment wherein: first surface of said corrector lens is formed aspherical.

Example elements for the second embodiment follow. A Compact VNIR/SWIR Spectrometer as in the second embodiment wherein: said pupil lens is a double path lens. A Compact VNIR/SWIR Spectrometer as in the second embodiment wherein: length of said slit is 1.36 inches. A Compact VNIR/SWIR Spectrometer as in the second embodiment wherein: said Mangin lens has a positive optical power. A Compact VNIR/SWIR Spectrometer as in the second embodiment wherein: said pupil lens has a negative optical power. A Compact VNIR/SWIR Spectrometer as in the second embodiment wherein: said diffraction grating has a positive optical power. A Compact VNIR/SWIR Spectrometer as in the second embodiment wherein: said first corrector lens has a positive optical power. A Compact VNIR/SWIR Spectrometer as in the second embodiment wherein: said second corrector lens has a positive optical power. A Compact VNIR/SWIR Spectrometer as in the second embodiment wherein: said Mangin lens is shaped as a double convex lens. A Compact VNIR/SWIR Spectrometer as in the second embodiment wherein: said pupil lens is shaped as a negative meniscus lens whose convex surface faces toward said diffraction grating. A Compact VNIR/SWIR Spectrometer as in the second embodiment wherein: said diffraction grating is shaped as a concave reflective surface facing the incoming beam. A Compact VNIR/SWIR Spectrometer as in the second embodiment wherein: said first corrector lens is shaped as a double convex lens. A Compact VNIR/SWIR Spectrometer as in the second embodiment wherein: said second corrector lens is shaped as a double convex lens whose convex surface faces toward said FPA. A Compact VNIR/SWIR Spectrometer as in the second embodiment wherein: first surface of said Mangin lens is formed aspherical. A Compact VNIR/SWIR Spectrometer as in the second embodiment wherein: second surface of said pupil lens is formed aspherical. A Compact VNIR/SWIR Spectrometer as in the second embodiment wherein: first surface of said first corrector lens is formed aspherical. A Compact VNIR/SWIR Spectrometer as in the second embodiment wherein: second surface of said second corrector lens is formed aspherical.

Example elements for the third embodiment follow. A Compact SWIR Spectrometer as in the third embodiment wherein said grating comprises an immersion grating. A Compact SWIR Spectrometer as in the third embodiment wherein: said grating comprises a reflective grating. A Compact SWIR Spectrometer as in the third embodiment herein: said diffraction grating diffracts SWIR radiation in a first order. A Compact SWIR Spectrometer as in the third embodiment wherein: said aperture stop is located at the grating. A Compact SWIR Spectrometer as in the third embodiment wherein: said pupil lens is a double path lens. A Compact and Athermal VNIR/SWIR Spectrometer as in the third embodiment wherein: length of said slit is 0.96 inches. A Compact SWIR Spectrometer as in the third embodiment wherein: said Mangin lens has a positive optical power. A Compact SWIR Spectrometer as in the third embodiment wherein: said pupil lens has a negative optical power. A Compact SWIR Spectrometer as in the third embodiment wherein: said diffraction grating has a positive optical power. A Compact SWIR Spectrometer as in the third embodiment wherein: said first corrector lens has a positive optical power. A Compact SWIR Spectrometer as in the third embodiment wherein: said second corrector lens has a positive optical power. A Compact SWIR Spectrometer as in the third embodiment wherein: said Mangin lens is shaped as a double convex lens. A Compact SWIR Spectrometer as in the third embodiment wherein: said pupil lens is shaped as a negative meniscus lens whose concave surface faces toward said diffraction grating. A Compact SWIR Spectrometer as in the third embodiment wherein: said diffraction grating is shaped as a concave reflective surface facing the incoming beam. A Compact SWIR Spectrometer as in the third embodiment wherein: said first corrector lens is shaped as a double convex lens. A Compact SWIR Spectrometer as in the third embodiment wherein: said second corrector lens is shaped as a double convex lens whose convex surface faces toward said FPA. A Compact SWIR Spectrometer as in the third embodiment wherein: first surface of said Mangin lens is formed aspherical. A Compact SWIR Spectrometer as in the third embodiment wherein: second surface of said pupil lens is formed aspherical. A Compact SWIR Spectrometer as in the third embodiment wherein: first surface of said first corrector lens is formed aspherical.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. An athermal VNIR/SWIR Dyson type spectrometer comprising:
    a slit;
    a diffraction grating;
    an optical system forming spectral components of radiation received by said slit;
    a plurality of focal plane arrays (FPAs);
    wherein 2.5<F'/OAL<3.5;
    where
        F' is the focal length of the spectrometer; and
        OAL is the overall length of the spectrometer along the optical axis from the slit to the FPAs;
        wherein said overall length of said Dyson type spectrometer is from 2.5 inches to 4 inches;
        a wavelength range of said VNIR/SWIR is 400 nm to 2350 nm;
        a slit length of 0.48 inch to 0.68 inch; and
        an F# is 3 to 3.3.

2. The spectrometer of claim 1 comprising:
    said slit;
    a Mangin lens comprising a partially reflective and partially refractive surface;
    a pupil lens;
    said diffraction grating;
    an aperture stop;
    a corrector lens;
    a beam splitter;
    a first field lens;
    a second field lens;
    a SWIR FPA; and
    a VNIR FPA;
    wherein said slit, Mangin lens, pupil lens, diffraction grating, corrector lens, beam splitter, field lenses and FPAs are positioned wherein said slit transmits radiation to a reflective part of said Mangin lens surface and said reflective part directs radiation onto said pupil lens, said pupil lens directs radiation onto said diffraction grating, said diffraction grating diffracts radiation in said SWIR spectrum in a first diffraction order and diffracts radiation in said VNIR spectrum in a second diffraction order and directs radiation onto said pupil lens, said pupil lens directs said SWIR and said VNIR radiation onto said refractive part of said Mangin lens, said Mangin lens directs radiation onto said corrector lens, said corrector lens directs radiation onto said beam splitter, said beam splitter having a coating and transmits said SWIR radiation onto said first field lens and said beam splitter reflects said VNIR radiation onto said second field lens, said first field lens forming an image of said slit at said SWIR FPA and said second field lens forming an image of said slit at said VNIR FPA.

3. The spectrometer of claim 2, wherein said beam splitter transmits SWIR radiation and reflects VNIR radiation.

4. The spectrometer of claim 2, wherein thermal defocus does not exceed depth of focus in a temperature range from −10C° to 40 C° for both SWIR and VNIR spectrums.

5. The spectrometer of claim 2, wherein said pupil lens is a double path lens.

6. The spectrometer of claim 2, wherein a length of said slit is 1.36 inches.

7. The spectrometer of claim 2, wherein said Mangin lens has a positive optical power.

8. The spectrometer of claim 2, wherein said pupil lens has a negative optical power.

9. The spectrometer of claim 2, wherein said diffraction grating has a positive optical power.

10. The spectrometer of claim 1, wherein said grating comprises an immersion grating.

11. The spectrometer of claim 1, wherein said grating comprises a reflective grating.

12. The spectrometer of claim 1, wherein said diffraction grating diffracts SWIR radiation in a first order and VNIR radiation in a second order.

13. The spectrometer of claim 1, wherein a density of said diffraction grating is 45 grooves/mm.

14. The spectrometer of claim 1, wherein an aperture stop is located at said grating.

15. A VNIR/SWIR Dyson type spectrometer comprising:
a slit;
a Mangin lens comprising a partially reflective and partially refractive surface;
a pupil lens;
a diffraction grating;
an aperture stop;
a first corrector lens;
a second corrector lens;
a single SWIR/VNIR FPA;
wherein said overall length of said Dyson type spectrometer is from 2.5 inches to 4 inches;
a wavelength range of said VNIR/SWIR is 400 nm to 2350 nm;
a slit length of 0.48 inch to 0.68 inch; and
an F# is 3 to 3.3;
said slit, Mangin lens, pupil lens, diffraction grating, corrector lenses and FPA are positioned wherein said slit transmits radiation to said reflective part of said Mangin lens surface and said reflective part directs radiation onto said pupil lens, said pupil lens directs radiation onto said diffraction grating, said diffraction grating diffracts radiation in at least one of said SWIR and said VNIR spectrums in a first diffraction order and directs radiation onto said pupil lens, said pupil lens directs radiation onto said refractive part of said Mangin lens, said Mangin lens directs radiation onto said first corrector lens, said first corrector lens directs radiation onto said second corrector lens, said second corrector lens forms image of said slit at said SWIR/VNIR FPA;

wherein focal lengths of lens and optical groups satisfy the relationships $$0.95 < F'_{200}/F'_{ML202} < 1.55$$

$$-0.45 < F'_{200}/F'_{PL203} < -0.2$$

$$1.5 < F'_{200}/F'_{C205} < 1.85$$

$$0.35 < F'_{200}/F'_{C206} < 0.6$$

$$2.15 < F'_{200}/F'_{DG204} < 2.65$$

$$2.25 < F'/OAL_{200} < 2.8$$

$$7.75 < F'_{200}/DEC_{200} < 8.6$$

$$2.6 < V_{ML202}/V_{PL203} < 3.5$$

$$2.6 < V_{ML202}/V_{C205} < 3.5$$

$$1.2 < V_{ML202}/V_{C206} < 2$$

where
$F'_{200}$ is the focal length of the spectrometer;
$F'_{ML202}$ is the focal length of the Mangin lens;
$F'_{C205}$ is the focal length of the first corrector lens;
$F'_{C206}$ is the focal length of the second corrector lens;
$F'_{PL203}$ is the focal length of the pupil lens;
$F'_{DG204}$ is the focal length of the diffraction grating;
$OAL_{200}$ is the overall length of the spectrometer along the optical axis from the slit to the FPA;
$DEC_{200}$ is the decentration of the slit with respect to the optical axis in the direction perpendicular to the length of the slit;
$V_{ML202}$ is the Abbe number for the current wave length of the glass of the Mangin lens;
$V_{PL203}$ is the Abbe number for the current wave length of the glass of the pupil lens;
$V_{C205}$ is the Abbe number for the current wave length of the first corrector lens; and
$V_{C206}$ is the Abbe number for the current wave length of the second corrector lens.

16. The spectrometer of claim 15, wherein said grating comprises an immersion grating.

17. The spectrometer of claim 15, wherein said grating comprises a reflective grating.

18. The spectrometer of claim 15, wherein said diffraction grating diffracts both SWIR and VNIR radiation in a first order.

19. The spectrometer of claim 15, wherein said aperture stop is located at the grating.

20. A SWIR Dyson type spectrometer comprising:
a slit;
a Mangin lens comprising a partially reflective and partially refractive surface;
a pupil lens;
a diffraction grating;
an aperture stop;
a first corrector lens;
a second corrector lens;
a single SWIR FPA;

wherein an overall length of said Dyson type spectrometer is from 2.5 inches to 4 inches;
a wavelength range of said VNIR/SWIR is 400 nm to 2350 nm;
a slit length of 0.48 inch to 0.68 inch; and
an F# is 3 to 3.3;
said slit, Mangin lens, pupil lens, diffraction grating, corrector lenses and FPA are positioned wherein said slit transmits radiation to said reflective part of said Mangin lens surface and said reflective part directs radiation onto said pupil lens, said pupil lens directs radiation onto said diffraction grating, said diffraction grating diffracts radiation in said SWIR spectrum in a first diffraction order and directs radiation onto said pupil lens, said pupil lens directs radiation onto said refractive part of said Mangin lens, said Mangin lens directs radiation onto said first corrector lens, said first corrector lens directs radiation onto said second corrector lens, said second corrector lens forming an image of said slit at said SWIR FPA;
wherein focal lengths of lens and optical groups satisfy the relationships $0.55 < F'_{800}/F'_{ML802} < 0.85$ $-0.1 < F'_{800}/F'_{PL803} < -0.055$ $0.9 < F'_{800}/F'_{C805} < 1.4$ $0.3 < F'_{800}/F'_{C806} < 0.6$ $1.5 < F'_{800}/F'_{DG804} < 2.5$ $1.2 < F'_{800}/OAL_{800} < 1.6$ $2.5 < F'_{800}/DEC_{800} < 4.5$;

$0.25° \beta_{804} \leq 4°$ $2.4 < V_{ML802}/V_{PL803} < 3.5$ $0.8 < V_{ML802}/V_{C805} < 1.2$ $3.5 < V_{ML802}/V_{C806} < 4.5$ wherein:
$F'_{800}$ is the focal length of the spectrometer;
$F'_{ML802}$ is the focal length of the Mangin lens;
$F'_{C805}$ is the focal length of the first corrector lens;
$F'_{C806}$ is the focal length of the second corrector lens;
$F'_{PL803}$ is the focal length of the pupil lens;
$F'_{DG804}$ is the focal length of the diffraction grating;
$OAL_{800}$ is the overall length of the spectrometer along the optical axis from the slit to the FPA;
$DEC_{800}$ is the decentration of the slit with respect to the optical axis in the direction perpendicular to the length of the slit;
$\beta_{804}$ is diffraction grating counter-clockwise rotation angle, around the axis perpendicular to the optical axis of Mangin lens
$V_{ML802}$ is the Abbe number for the current wave length of the glass of the Mangin lens;
$V_{PL803}$ is the Abbe number for the current wave length of the glass of the pupil lens;
$V_{C805}$ is the Abbe number for the current wave length of the glass of the first corrector lens; and
$V_{C806}$ is the Abbe number for the current wave length of the glass of the second corrector lens.

* * * * *